US012389439B2

(12) United States Patent
Wang et al.

(10) Patent No.: US 12,389,439 B2
(45) Date of Patent: Aug. 12, 2025

(54) METHOD OF BANDWIDTH PART MANAGEMENT FOR A NETWORK AND CONTROLLER THEREFOR

(71) Applicant: INDUSTRIAL TECHNOLOGY RESEARCH INSTITUTE, Hsinchu (TW)

(72) Inventors: Yu-Chieh Wang, Hsinchu (TW); Kai-Wen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 411 days.

(21) Appl. No.: 18/089,847

(22) Filed: Dec. 28, 2022

(65) Prior Publication Data

US 2024/0224315 A1   Jul. 4, 2024

(51) Int. Cl.
  *H04W 72/541*   (2023.01)
  *H04W 72/044*   (2023.01)
(52) U.S. Cl.
  CPC ....... *H04W 72/541* (2023.01); *H04W 72/044* (2013.01)
(58) Field of Classification Search
  CPC . H04W 72/044; H04W 72/51; H04W 72/541; H04W 72/542; H04W 16/14
  See application file for complete search history.

(56) References Cited

U.S. PATENT DOCUMENTS

| 6,816,732 | B1 | 11/2004 | Farley et al. |
| 9,071,291 | B2 | 6/2015 | Zhu et al. |
| 10,594,468 | B2 | 3/2020 | Liao et al. |

(Continued)

FOREIGN PATENT DOCUMENTS

| CN | 109496454 A | 3/2019 |
| CN | 113891464 A | 1/2022 |

(Continued)

OTHER PUBLICATIONS

Taiwanese Office Action and Search Report for Taiwanese Application No. 112110457, dated Aug. 7, 2024.
Abe et al., "Dynamic Bandwidth Allocation for Spectrum Shared Private Mobile Networks Using Prior Measured CQI Information", 2019 IEEE International Symposium on Dynamic Spectrum Access Networks (DySPAN), total 6 pages.

(Continued)

*Primary Examiner* — Allahyar Kasraian
(74) *Attorney, Agent, or Firm* — Birch, Stewart, Kolasch & Birch, LLP

(57) ABSTRACT

A method of bandwidth part (BWP) management for a network is provided. Position information of user equipments is received. Whether interference exists between any two of the user equipments is determined based on the position information of the user equipments and the position information of the base stations to obtain an interference status of the user equipments. Interference exists between user equipment(s) of any two base stations in each of the at least one base station combination. Interference exists between a first user equipment and a second user equipment in a first base station combination. BWP resource allocation is performed based on the at least one base station combination and the interference status of the user equipments to obtain a BWP resource allocation result. The first user equipment is assigned with a first BWP frequency band and the second user equipment is assigned with a second BWP frequency band.

20 Claims, 25 Drawing Sheets

(56) References Cited

U.S. PATENT DOCUMENTS

| | | |
|---|---|---|
| 10,785,656 B2 | 9/2020 | Ang et al. |
| 11,026,223 B2 | 6/2021 | Nam et al. |
| 11,109,382 B2 | 8/2021 | Bassirat et al. |
| 11,202,234 B1 | 12/2021 | Mehta et al. |
| 2018/0199343 A1 | 7/2018 | Deogun et al. |
| 2019/0190681 A1 | 6/2019 | Li et al. |
| 2020/0322900 A1* | 10/2020 | Guo ............... H04W 52/36 |
| 2021/0051688 A1* | 2/2021 | Zhao ............... H04W 4/40 |
| 2021/0112550 A1* | 4/2021 | Lekutai ............ H04W 72/541 |
| 2022/0201676 A1* | 6/2022 | Kumar ............. H04L 5/0051 |
| 2022/0240250 A1 | 7/2022 | Li |
| 2023/0171625 A1* | 6/2023 | Ma ................. H04W 72/56 370/252 |
| 2023/0247439 A1* | 8/2023 | Kim ................ H04W 16/10 370/329 |

FOREIGN PATENT DOCUMENTS

| | | |
|---|---|---|
| CN | 114302467 A | 4/2022 |
| TW | 202015437 A | 4/2020 |
| WO | WO 2019/029519 A1 | 2/2019 |

OTHER PUBLICATIONS

Baccelli et al., "Bandwidth Allocation and Service Differentiation in D2D Wireless Networks", IEEE Xplore, Dec. 23, 2022, total 10 pages.

Correia et al., "Adaptive Spectrum Allocation for 5G Wireless Communication Scenarios", IEEE Xplore, Dec. 23, 2022, total 6 pages.

Khan et al., "Service-Based Network Dimensioning for 5G Networks Assisted by Real Data", IEEE, Jul. 14, 2020, vol. 8, total 20 pages.

Kotagiri et al., "Context-based Mixed-Numerology Profile Selection for 5G and Beyond", 2022 IEEE 19th Annual Consumer Communications & Networking Conference (CONC), total 6 pages.

Sun et al., "Practical Scheduling Algorithms With Contiguous Resource Allocation for Next-Generation Wireless Systems", IEEE Wireless Communications Letters, Apr. 2021, vol. 10, No. 4, p. 725-729.

Tran et al., "Interference-aware Coordinated Access Control for Heterogeneous Cellular D2D Communication Networks", International Journal of Advanced Trends in Computer Science and Engineering, Mar.-Apr. 2021, vol. 10, No. 2, p. 1207-1215.

* cited by examiner

| Request ID | 1 | 2 |
|---|---|---|
| Node ID | gNB1 | gNB2 |
| RAN Function | BWP | BWP |
| RAN Function | Monitoring | Monitoring |
| RAN Function | Traffic steering | Traffic steering |
| RAN Function | ... | ... |

FIG. 6

| Request ID | 1 |
|---|---|
| RAN Function | BWP |
| Action | Re-allocating the BWP resources in base stations |
| Action | Assigning BWP resources to user equipments for current communication |

FIG. 7

| Position information of base stations | | |
|---|---|---|
| Base station ID | X | Y |
| gNB1 | 60 | 15 |
| gNB2 | 60 | 15 |

| User equipment connection information | |
|---|---|
| User equipment ID | Connected to |
| UE1 | gNB2 |
| UE2 | gNB2 |
| UE3 | gNB1 |
| UE4 | gNB1 |

| Position information of user equipments | | | |
|---|---|---|---|
| User equipment ID | Time stamp | X | Y |
| UE1 | 1648536823911 | 3 | 13 |
| UE2 | ... | 27 | 12 |
| UE3 | ... | 33 | 14 |
| UE4 | ... | 56 | 20 |

FIG. 8

| BWP ID | Start from | Bandwidth |
|---|---|---|
| 1 | 0 | 50 |
| 2 | 50 | 50 |

| User Equipment ID | BWP ID |
|---|---|
| UE1 | 1 |
| UE2 | 1 |
| UE3 | 2 |
| UE4 | 2 |

FIG. 9

| Control message for base station BS2 | | | |
|---|---|---|---|
| Request ID | 1 | | |
| RAN Function | BWP | | |
| Action | Re-allocating the BWP resources in base stations | | |
| Subaction | BWP ID | Start from | Bandwidth |
| | 1 | 0 | 50 |
| | 2 | 50 | 50 |
| Action | Assigning BWP resources to user equipments for current communication | | |
| Subaction | User Equipment ID | BWP ID | |
| | UE1 | 1 | |
| | UE2 | 1 | |

| Control message for base station BS1 | | | |
|---|---|---|---|
| Request ID | 2 | | |
| RAN Function | BWP | | |
| Action | Re-allocating the BWP resources in base stations | | |
| Subaction | BWP ID | Start from | Bandwidth |
| | 1 | 0 | 50 |
| | 2 | 50 | 50 |
| Action | Assigning BWP resources to user equipments for current communication | | |
| Subaction | User Equipment ID | BWP ID | |
| | UE3 | 2 | |
| | UE4 | 2 | |

FIG. 10

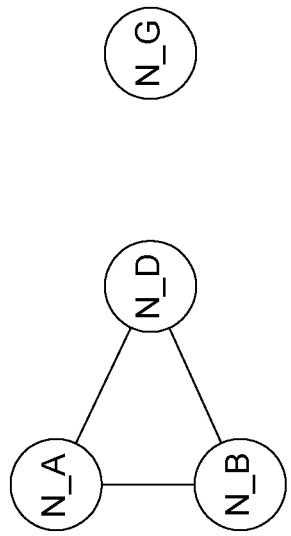
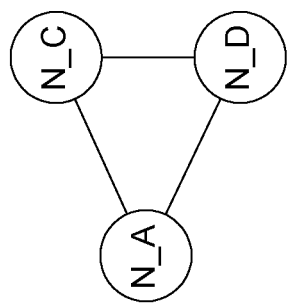
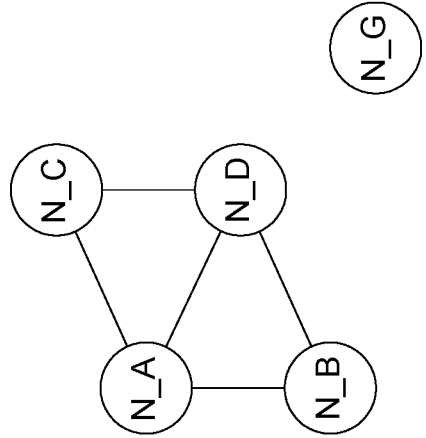
FIG. 16A
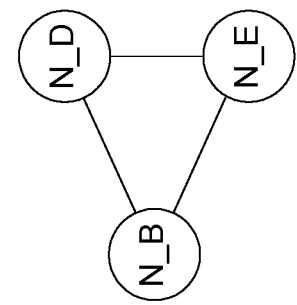
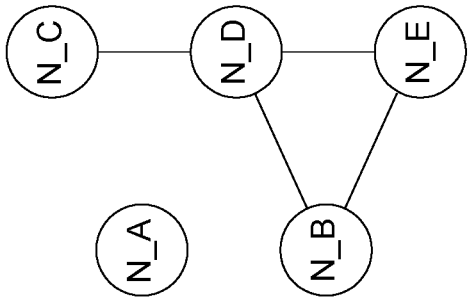
FIG. 16B

| User Equipment ID | Assigned BWP bandwidth (Proportion of available BWP bandwidth) |
|---|---|
| UE_1 | 1/4 |
| UE_2 | 1/2 |
| UE_3 | 3/4 |
| UE_4 | 1/4 |
| UE_5 | 1/4 |
| UE_6 | 1/4 |
| UE_7 | 1 |

FIG. 19

METHOD OF BANDWIDTH PART MANAGEMENT FOR A NETWORK AND CONTROLLER THEREFOR

TECHNICAL FIELD

The disclosure relates in general to a method of bandwidth part (BWP) management and a controller therefor, and more particularly to a method of BWP management for a network and a controller therefor.

BACKGROUND

Due to the diversity and variability of applications, the private 5G network should satisfy dynamic service-level agreement (SLA) assurance. For example, moving user equipments should have stable quality of experience (QoE), different user equipments may have different QoE requirements, and the QoE requirements of user equipments may change dynamically. Slicing technologies are often used for satisfying the requirements of 5G SLA assurance. Slicing technologies include technologies of network slicing, software defined network (SDN), and resource block (RB) scheduling.

The resources of core networks can be sliced through the network slicing technology. The resources of transmission networks can be sliced through SDN technology. The resources of radio access network (RAN) can be sliced through resource block (RB) scheduling. The minimum unit of transmission resources of the base station is RB. RB scheduling is performed by allocating RBs of different amounts of time slots to different users which have different QoE requirements.

However, in a network with a number of base stations, RAN only considers RB allocation, and does not consider how to increase modulation and code rate. When the signal quality of transmission is poor, low modulation and code rate is produced, which results in low throughput of signal transmission. Therefore, how to improve the modulation and code rate to increase the throughput of signal transmission has become a prominent task for the industries.

SUMMARY

The disclosure is directed to a method of bandwidth part (BWP) management for a network, performed by a controller, including the following steps. Position information of a number of user equipments is received. The network includes a number of base stations communicating with the user equipments. The user equipments include a first user equipment and a second user equipment. Whether interference exists between any two of the user equipments is determined based on the position information of the user equipments and the position information of the base stations to obtain an interference status of the user equipments. At least one base station combination is generated. Interference exists between user equipment(s) of any two base stations in each of the at least one base station combination. The at least one base station combination includes a first base station combination. The first base station combination includes a first base station and a second base station. The first base station communicates with the first user equipment, and the second base station communicates with the second user equipment. Interference exists between the first user equipment and the second user equipment. BWP resource allocation is performed based on the at least one base station combination and the interference status of the user equipments to obtain a BWP resource allocation result. The first user equipment is assigned with a first BWP frequency band and the second user equipment is assigned with a second BWP frequency band in the BWP resource allocation result. The first BWP frequency band is different from the second BWP frequency band.

According to one embodiment, a controller for performing BWP management for a network is provided. The controller includes an information interface and a processor. The information interface is configured for receiving position information of a number of user equipments. The network includes a number of base stations communicating with the user equipments. The user equipments include a first user equipment and a second user equipment. The processor is configured to perform the following procedures. Whether interference exists between any two of the user equipments is determined based on the position information of the user equipments and the position information of the base stations to obtain an interference status of the user equipments. At least one base station combination is generated. Interference exists between user equipment(s) of any two base stations in each of the at least one base station combination. The at least one base station combination includes a first base station combination. The first base station combination includes a first base station and a second base station. The first base station communicates with the first user equipment, and the second base station communicates with the second user equipment. Interference exists between the first user equipment and the second user equipment. BWP resource allocation is performed based on the at least one base station combination and the interference status of the user equipments to obtain a BWP resource allocation result. The first user equipment is assigned with a first BWP frequency band and the second user equipment is assigned with a second BWP frequency band in the BWP resource allocation result. The first BWP frequency band is different from the second BWP frequency band.

BRIEF DESCRIPTION OF THE DRAWINGS

FIG. 6 shows an example of the content of the requests which the base stations send to the intelligent controller.

FIG. 7 shows an example of the content of the requests which the intelligent controller sends to the base stations for establishing subscription.

FIG. 8 shows an example of the enrichment information data and an example of user equipment connection information.

FIG. 9 shows an example for the BWP resource allocation result.

FIG. 10 shows an example of the content of control message which the intelligent controller sends to the base stations for controlling the base stations.

FIG. 16A shows the relation graph of FIG. 14E and the corresponding complete graphs.

FIG. 16B shows the relation graph of another example and the corresponding complete graphs.

FIG. 19 illustrates the allocation result table by taking the complete graphs {N_A, N_C, N_D} as operation starting graph.

FIG. 20A shows the unmanned aerial vehicle (UAV) racing field, and FIG. 20B shows the block diagram for the network of UAV racing field.

Figure 1:
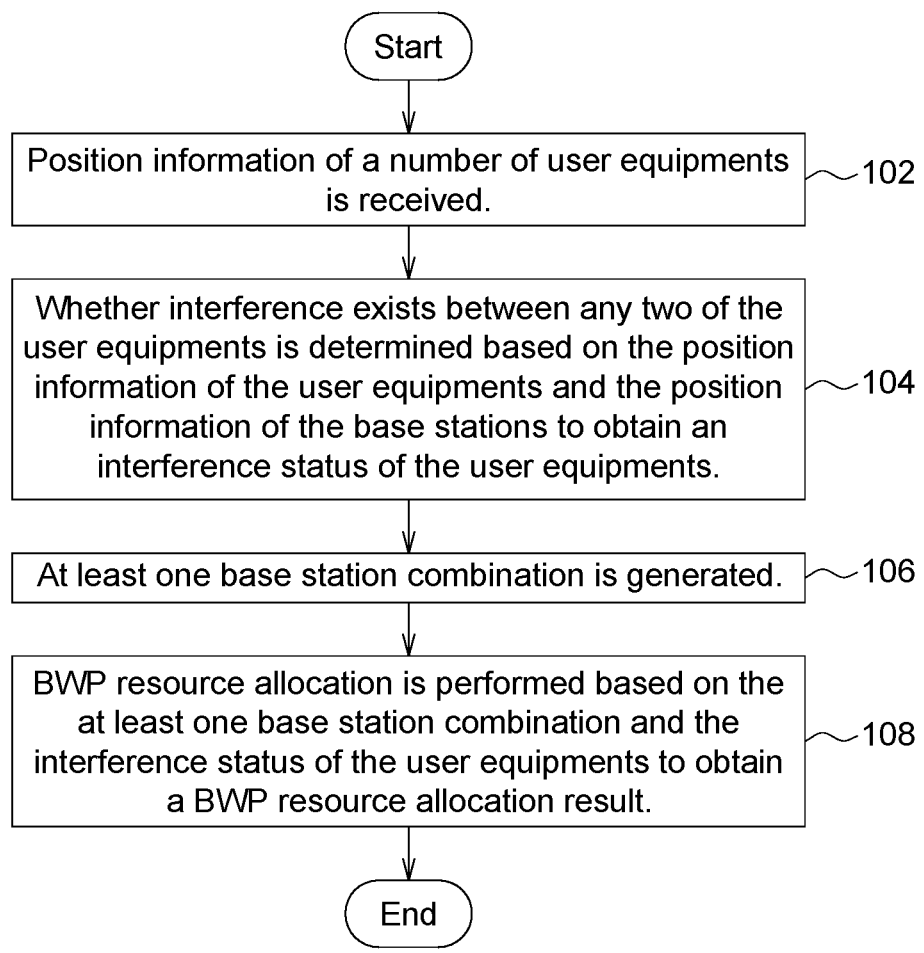
FIG. 1 shows a flow chart for a method of bandwidth part (BWP) management for a network according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
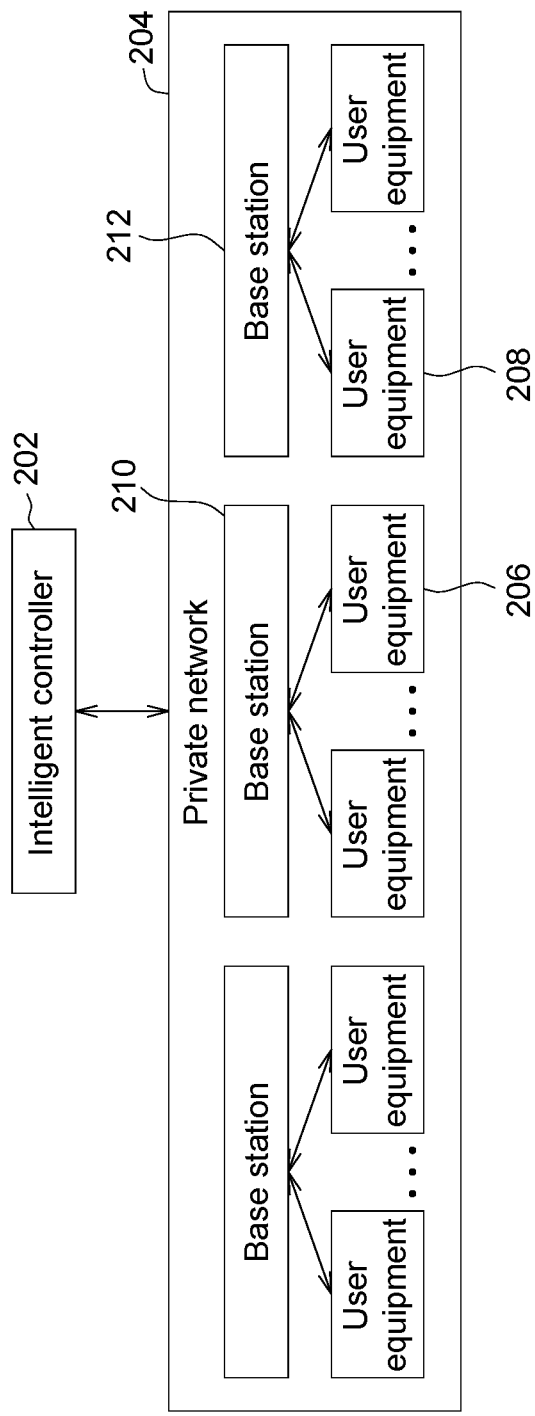
FIG. 2 shows the block diagram for the network.

Referring to FIG. 1 and FIG. 2, FIG. 1 shows a flow chart for a method of bandwidth part (BWP) management for a network according to an embodiment of the disclosure, and FIG. 2 shows the block diagram for the network. The method of BWP management is performed by a controller, for example, an intelligent controller 202. The method of BWP management for a network includes the following steps. Firstly, in step 102, position information of a number of user equipments is received. The network, for example, a private network 204, includes a number of base stations communicating with the user equipments. The user equipments included a first user equipment and a second user equipment. For example, the first user equipment is user equipment 206 and the second user equipment is user equipment 208.

After that, in step 104, whether interference exists between any two of the user equipments is determined based on the position information of the user equipments and the position information of the base stations to obtain an interference status of the user equipments. Then, in step 106, at least one base station combination is generated. Interference exists between user equipment(s) of any two base stations in each of the at least one base station combination. The at least one base station combination includes a first base station combination. The first base station combination includes a first base station and a second base station. For example, the first base station is the base station 210 and the second base station is the base station 212. The first base station communicates with the first user equipment. The second base station communicates with the second user equipment. Interference exists between the first user equipment and the second user equipment.

Then, in step 108, BWP resource allocation is performed based on the at least one base station combination and the interference status of the user equipments to obtain a BWP resource allocation result. The first user equipment is assigned with a first BWP frequency band and the second user equipment is assigned with a second BWP frequency band in the BWP resource allocation result. The first BWP frequency band is different from the second BWP frequency band.

Figure 3:
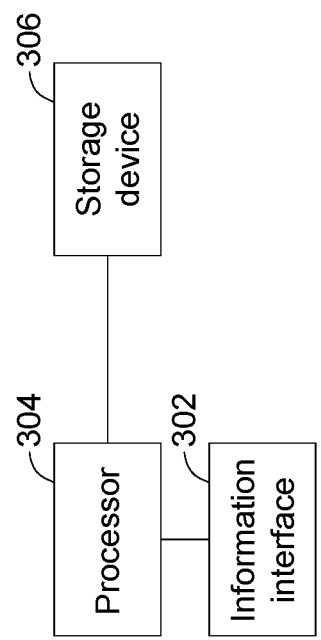
FIG. 3 shows a block diagram of an example of the controller according to an embodiment of the disclosure.

Referring to FIG. 3, FIG. 3 shows a block diagram of an example of the controller according to an embodiment of the disclosure. The controller includes an information interface 302 and a processor 304. The information interface 302 is configured to perform step 102 in FIG. 1 to receive position information of the user equipments. The processor 304 is configured to perform steps 104 to 108 in FIG. 1. The controller may further include a storage device 306, for storing the position information of the user equipments.

For a downlink communication, when a distance between the second user equipment and the first base station minus a distance between the first user equipment and the first base station is less than a first interference radius, it is determined that interference exists between the first user equipment and the second user equipment.

For an uplink communication, when a distance between the first user equipment and the second base station minus a distance between the first user equipment and the first base station is less than a second interference radius, it is determined that interference exists between the first user equipment and the second user equipment.

In one example, a unit bandwidth of the first BWP frequency band is obtained by dividing an available BWP bandwidth by P, P is an integer. P is an amount of user equipments of a particular base station in the first base station combination, and the particular base station has maximum amount of user equipments in the first base station combination.

Alternatively, a unit bandwidth of the first BWP frequency band is obtained by dividing an available BWP bandwidth by Q, Q is an integer. Q is the amount of user equipments which have interference with each other in the first base station combination.

In another example, a unit bandwidth of the first BWP frequency band is obtained by dividing an available BWP bandwidth by N, N is an integer. N is the maximum selected from P and Q, P and Q are integers. P is an amount of user equipments of a particular base station in the first base station combination, the particular base station has maximum amount of user equipments in the first base station combination, and Q is the amount of user equipments which have interference with each other in the first base station combination.

In one example, the method of BWP management for a network further includes the following steps. Firstly, a relation graph for the network is established. The relation graph includes a number of nodes and a number of connection lines. The nodes include a first node and a second node. The connection lines include a first connection line. The first node represents the first base station, the second node represents the second base station, and the first connection connects the first node and the second node.

The relation graph includes at least one complete graph corresponding to the at least one base station combination. The at least one complete graph includes a first complete graph corresponding to the first base station combination. The user equipments which have interference with each other in the base stations of the first complete graph are assigned with different BWP frequency bands in the BWP resource allocation result.

In one example, the first base station combination further includes a third base station, the user equipments further includes a third user equipment. The third user equipment communicates with the third base station. The third user equipment is assigned with a third BWP frequency band. The third BWP frequency band is different from the first BWP frequency band, and the third BWP frequency band is different from the second BWP frequency band.

In one example, the at least one base station combination further includes a second base station combination. The second base station combination includes the first base station and a fourth base station. The user equipments further includes a fourth user equipment. The fourth user equipment communicates with the fourth base station. The fourth user equipment is assigned with a fourth BWP frequency band. The fourth BWP frequency band is different from the first BWP frequency band, and the fourth BWP frequency band is overlapped with the second BWP frequency band.

In one example, the method of BWP management for a network further includes the following steps. Whether throughputs for the user equipments conform to a predetermined requirement in a service-level agreement is determined. A first BWP switching command is sent to the first user equipment through the first base station and a second BWP switching command is sent to the second user equipment through the second base station. The first BWP switching command indicates that the first user equipment is assigned with the first BWP frequency band and the second BWP switching command indicates that the second user equipment is assigned with the second BWP frequency band.

Figure 4:
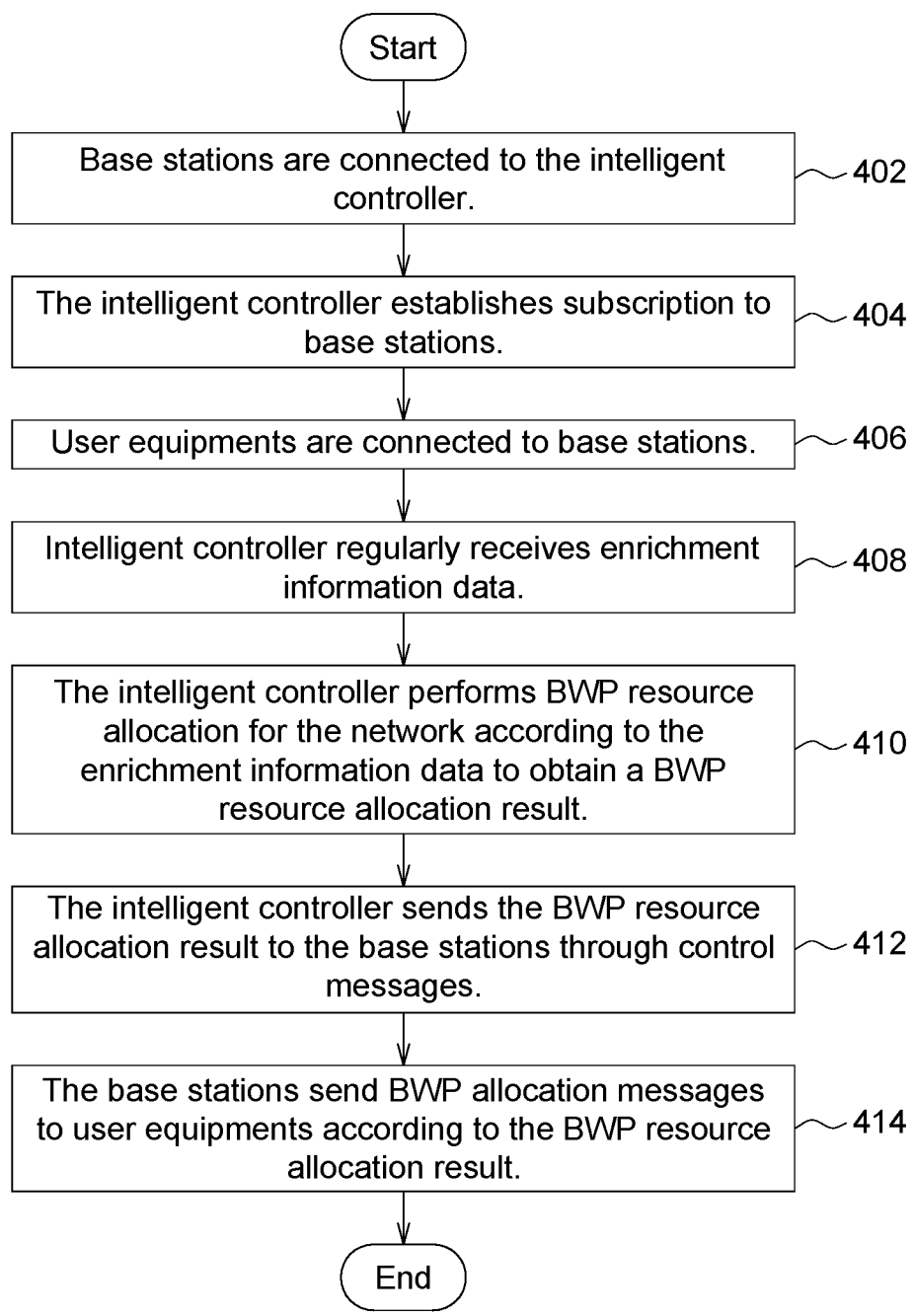
FIG. 4 shows a flow chart for a method of BWP management for a network according to another embodiment of the disclosure.
Figure 5:
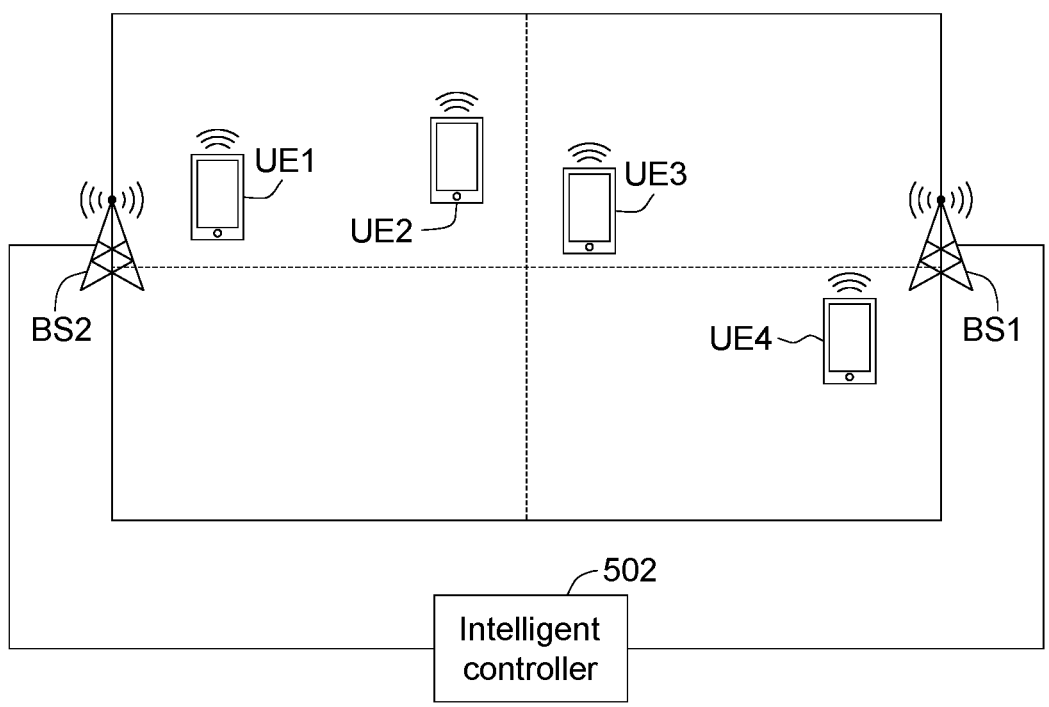
FIG. 5 shows an example of private network for the method in FIG. 4.

Referring to FIG. 4 and FIG. 5, FIG. 4 shows a flow chart for a method of BWP management for a network according to another embodiment of the disclosure, and FIG. 5 shows an example of private network for the method in FIG. 4. Firstly, in step 402, base stations are connected to the intelligent controller. For example, the base station BS1 and the base station BS2 are connected to the intelligent controller 502. FIG. 6 shows an example of the content of the requests which the base stations send to the intelligent controller. As shown in FIG. 6, the base station BS1 sends Request ID 1 to the intelligent controller 502, and the base station BS2 sends Request ID 2 to the intelligent controller 502. For example, the base station BS1 informs the intelligent controller 502 about the Node ID "gNB1" of the base station BS1 and the radio access network (RAN) functions which the base station BS1 supports by sending Request ID 1. For example, the base station BS1 supports the RAN functions of BWP, monitoring, and traffic steering.

After that, in step 404, the intelligent controller establishes subscription to base stations. FIG. 7 shows an example of the content of the requests which the intelligent controller sends to the base stations for establishing subscription. As shown in FIG. 7, the intelligent controller 502 sends Request ID 1 to the base station BS1. For example, the intelligent controller 502 informs the base station BS1 that the RAN function "BWP" is subscribed and the actions subscribed for RAN function "BWP" include re-allocating the BWP resources in base stations and assigning BWP resources to user equipments for current communication.

In step 406, user equipments are connected to base stations. For example, as shown in FIG. 5, the user equipments UE1 and UE2 are connected to the base station BS2, and the user equipments UE3 and UE4 are connected to the base station BS1. Then, in step 408, intelligent controller 502 regularly receives enrichment information (EI) data, for example, from an EI server (not shown in FIG. 5). The enrichment information data, for example, includes position information of user equipments and the position information of the base stations. FIG. 8 shows an example of the enrichment information data and an example of user equipment connection information. As shown in FIG. 8, the position information of user equipments may include time stamp and coordinate values X and Y of each user equipment. The position information of the base stations may include coordinate values X and Y of each base station. User equipment connection information includes the user equipment ID and the node ID of base stations which each of the user equipments is connected to. Alternatively, the position information of user equipments may be Global Positioning System (GPS) position information provided by the use equipments.

In step 410, the intelligent controller 502 performs BWP resource allocation for the network according to the enrichment information data to obtain a BWP resource allocation result. FIG. 9 shows an example for the BWP resource allocation result. As shown in FIG. 9, in the BWP resource allocation result, for example, the user equipments UE1 and UE2 are assigned with a first BWP frequency band and the user equipments UE3 and UE4 are assigned with a second BWP frequency band, the first BWP frequency band is different from the second BWP frequency band. For example, the BWP frequency band of BWP ID 1 starts from 0 (frequency unit) and has bandwidth of 50 (frequency unit), and the BWP frequency band of BWP ID 2 starts from 50 (frequency unit) and has bandwidth of 50 (frequency unit). The user equipments UE1 and UE2 are assigned with BWP ID 1 and the user equipments UE3 and UE4 are assigned with BWP ID 2. That is, the user equipments UE1 and UE2 are assigned with the BWP frequency band of 0 to 50 (frequency unit) and the user equipments UE3 and UE4 are assigned with the BWP frequency band of 50 to 100 (frequency unit).

In step 412, the intelligent controller 502 sends the BWP resource allocation result to the base stations through control messages. FIG. 10 shows an example of the content of control message which the intelligent controller sends to the base stations for controlling the base stations. As shown in FIG. 10, the intelligent controller 502 sends control message for base station BS2 (Request ID 1) to base station BS2, and the intelligent controller 502 sends control message for base station BS1 (Request ID 2) to base station BS1. For example, the intelligent controller 502 informs the base station BS2 that the RAN function "BWP" is subscribed and the actions subscripted for RAN function "BWP" include re-allocating the BWP resources in base stations and assigning BWP resources to user equipments for current communication. The sub-action for the actions of re-allocating the BWP resources in base stations includes the definition for BWP ID 1 and BWP ID 2 as shown in FIG. 9. The sub-action for the actions of assigning BWP resources to user equipments for current communication includes the assigning BWP ID 1 to user equipments UE1 and UE 2.

In the control message for base station BS1 (Request ID 2), it differs from the control message for base station BS2 (Request ID 1) in that the sub-action for the actions of assigning BWP resources to user equipments for current communication includes the assigning BWP ID 2 to user equipments UE3 and UE 4.

Figure 11A:
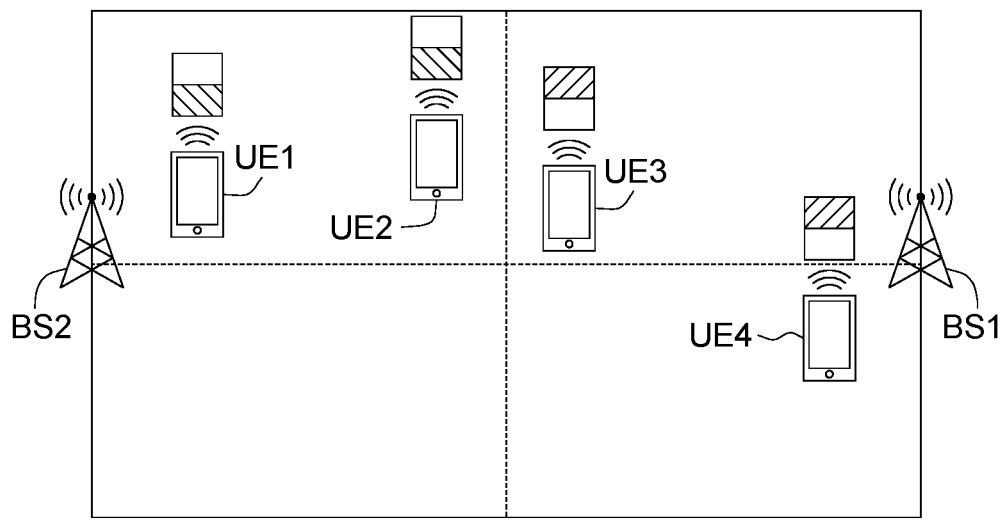
FIG. 11A and FIG. 11B show an example of the way the base stations communicating with the user equipments.
Figure 11B:
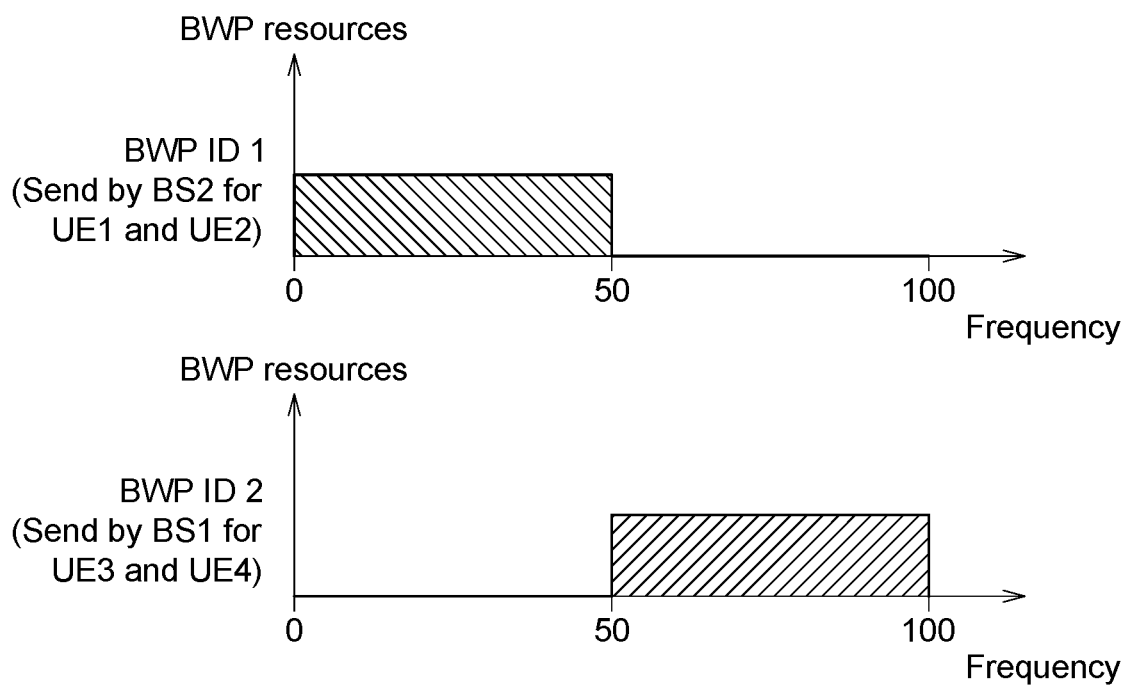

In step 414, the base stations send BWP allocation messages to user equipments according to the BWP resource allocation result. For example, the base station BS2 sends BWP allocation messages that base station BS2 will communicates with user equipments UE1 and UE2 by using the BWP frequency band defined by BWP ID 1 (BWP frequency band of 0 to 50 (frequency unit)), and the base station BS1 sends BWP allocation messages that base station BS1 will communicates with user equipments UE3 and UE4 by using the BWP frequency band defined by BWP ID 2 (BWP frequency band of 50 to 100 (frequency unit)). FIG. 11A and FIG. 11B show an example of the way the base stations communicating with the user equipments. As shown in FIG. 11A and FIG. 11B, the user equipments UE1 and UE2 communicate with base station BS2 with the BWP frequency band of frequency 0 to 50, the user equipments UE3 and UE4 communicate with base station BS1 with the BWP frequency band of frequency 50 to 100. Even interference may exists between the user equipments UE2 and UE3 when the user equipments UE2 and UE3 use the same frequency band to communicate with corresponding base stations, the interference will not exist under the situation that the user equipments UE2 and UE3 use the different frequency band to communicate with corresponding base stations.

Figure 12:
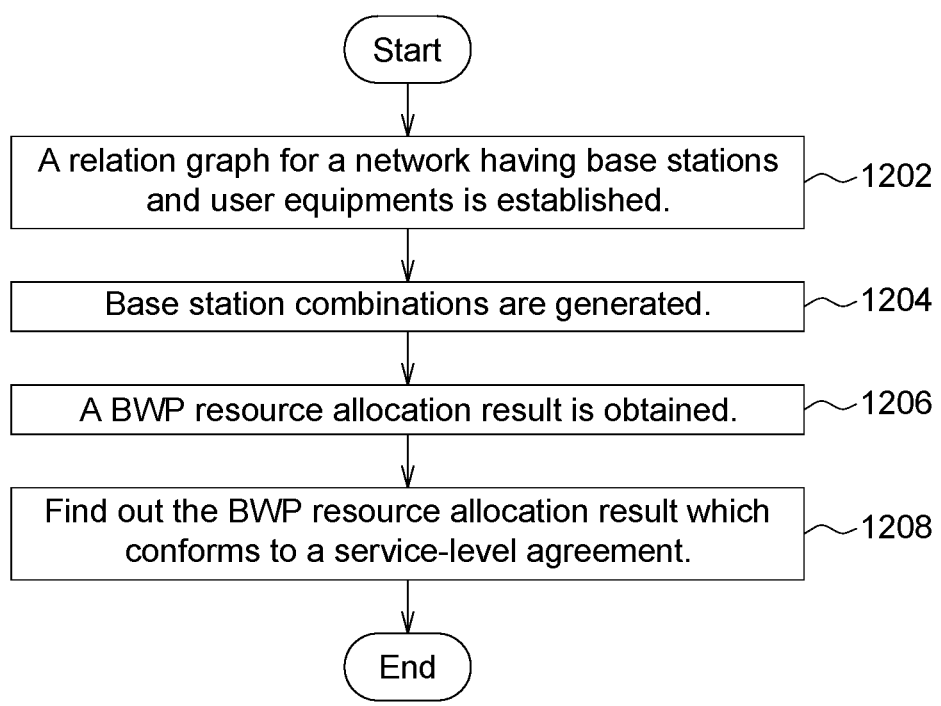
FIG. 12 shows the procedures for performing BWP resource allocation for the network according to the enrichment information data to obtain a BWP resource allocation result in step 410 according to one embodiment of the disclosure.

Referring to FIG. 12, the procedures for performing BWP resource allocation for the network according to the enrichment information data to obtain a BWP resource allocation result in step 410 according to one embodiment of the disclosure is shown. Firstly, in step 1202, a relation graph for a network having base stations and user equipments is established. After that, in step 1204, base station combinations are generated. Then, in step 1206, a BWP resource allocation result is obtained. After that, in step 1208, find out the BWP resource allocation result which conforms to a service-level agreement (SLA). Each step in FIG. 12 will be described in more detailed as follows.

Figure 13A:
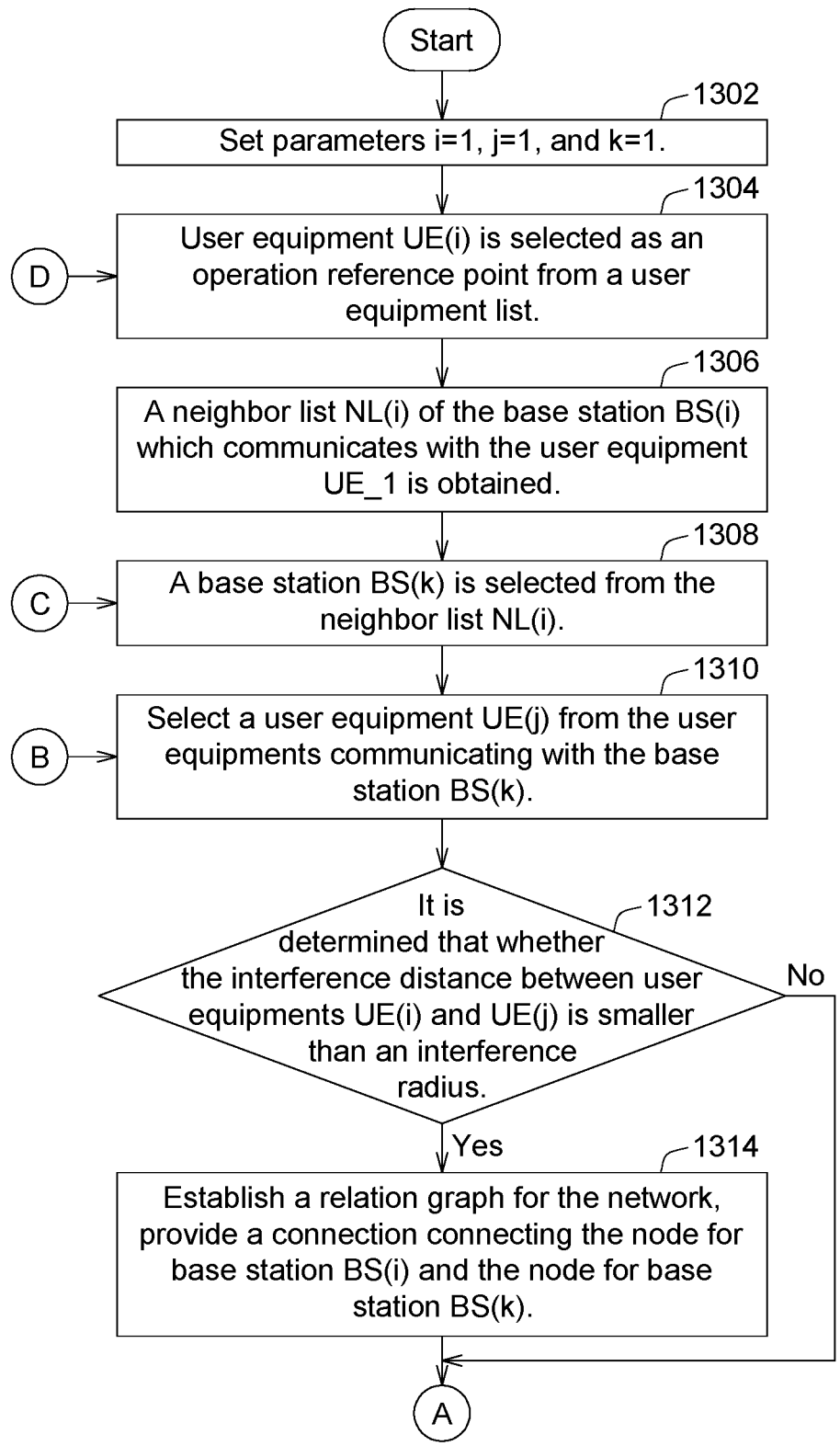
FIG. 13A and FIG. 13B illustrate detailed steps for establishing a relation graph for a network having base stations and user equipments in step 1202.
Figure 13B:
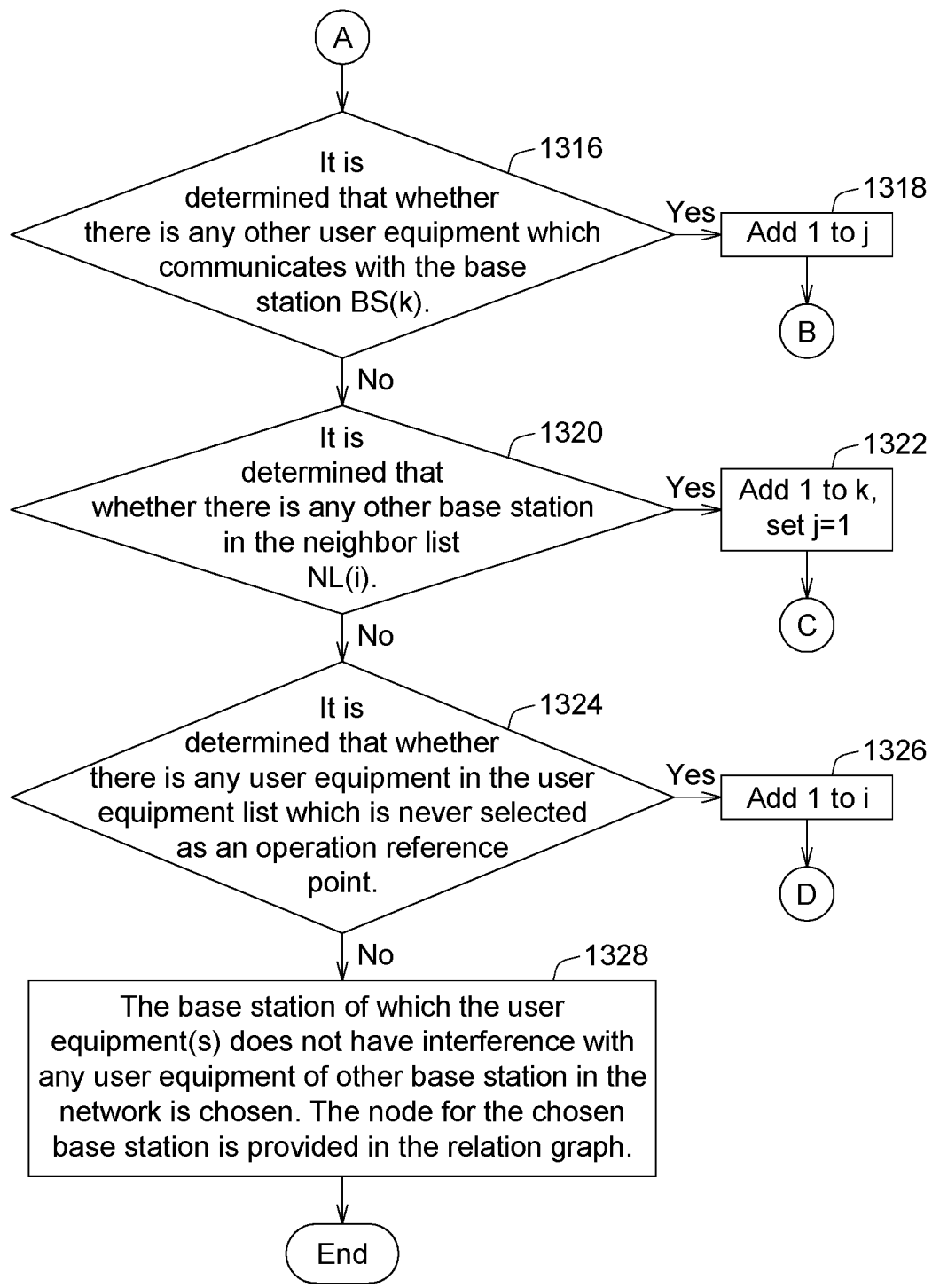
Figure 14A:
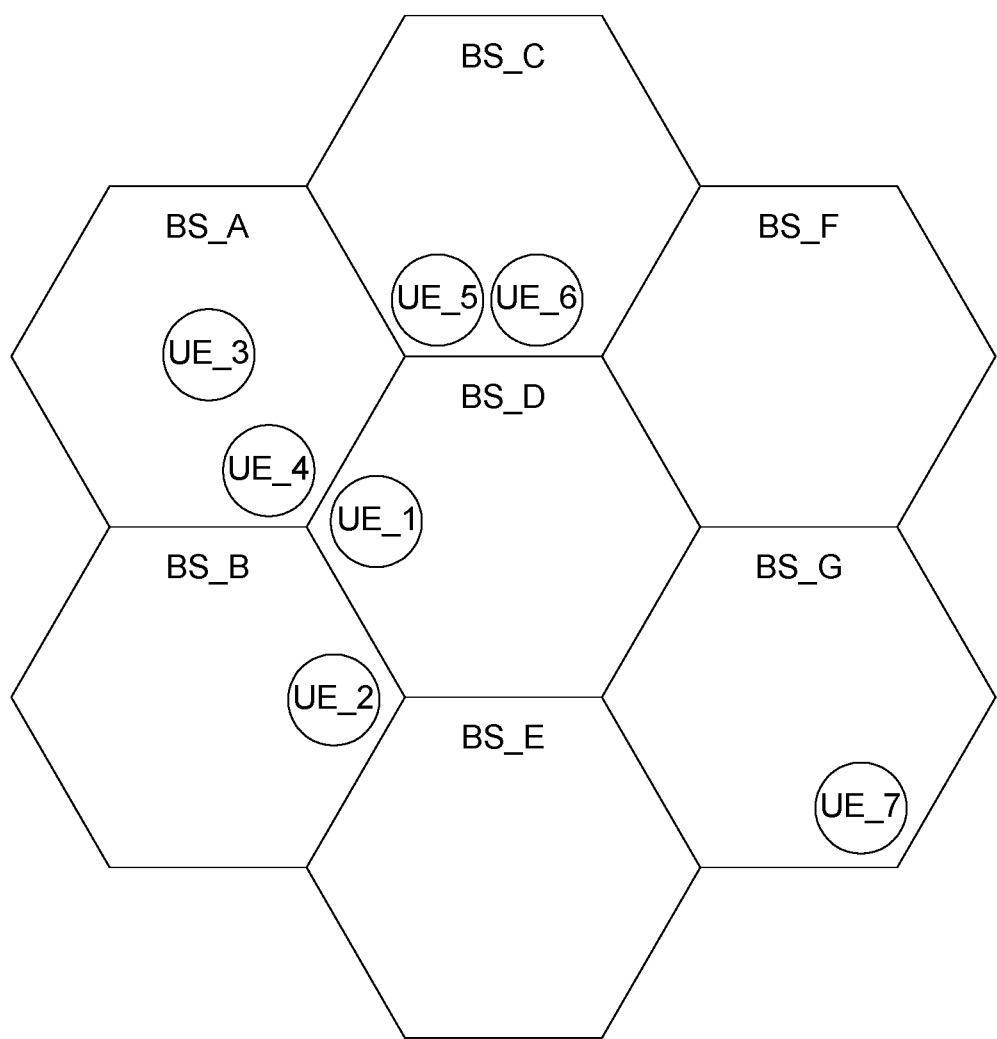
FIG. 14A shows an example of network.

Referring to FIG. 13A and FIG. 13B, detailed steps for establishing a relation graph for a network having base stations and user equipments in step 1202 is illustrated. In step 1302, set parameters i=1, j=1, and k=1, and i, j, and k are integers. Then, in step 1304, user equipment UE(i) is selected as an operation reference point from a user equipment list which includes all user equipments in the network. Assume the user equipment list UEL={UE_1, UE_2, UE_3, UE_4, UE_5, UE_6, UE_7}. Referring to FIG. 14A, which shows an example of network. Assume the user equipment UE_1 is selected and UE(i)=UE(1)=US_1. User equipment UE_1 is used as an operation reference point.

After that, in step 1306, a neighbor list NL(i) of the base station BS(i) which communicates with the user equipment UE_1 is obtained. For example, as shown in FIG. 14A, it is base station BS_D communicates with the user equipment UE_1, therefore the base station BS(i) (=BS(1)) is base station BS_D. For example, assume the neighbor list NL(i) of the base station BS_D is NL(1), NL(1)={BS_A, BS_B, BS_C, BS_E, BS_F, BS_G}, base stations BS_A, BS_B, BS_C, BS_E, BS_F, BS_G are base stations which are adjacent to the base station BS_D.

Then, in step 1308, a base station BS(k) is selected from the neighbor list NL(i). Assume base station BS_A is selected as BS(k). After that, in step 1310, select a user equipment UE(j) from the user equipments communicating with the base station BS(k). Since user equipment UE_3 and UE_4 communicates with the base station BS_A, assume user equipment UE_4 is selected as UE(j).

Figure 15A:
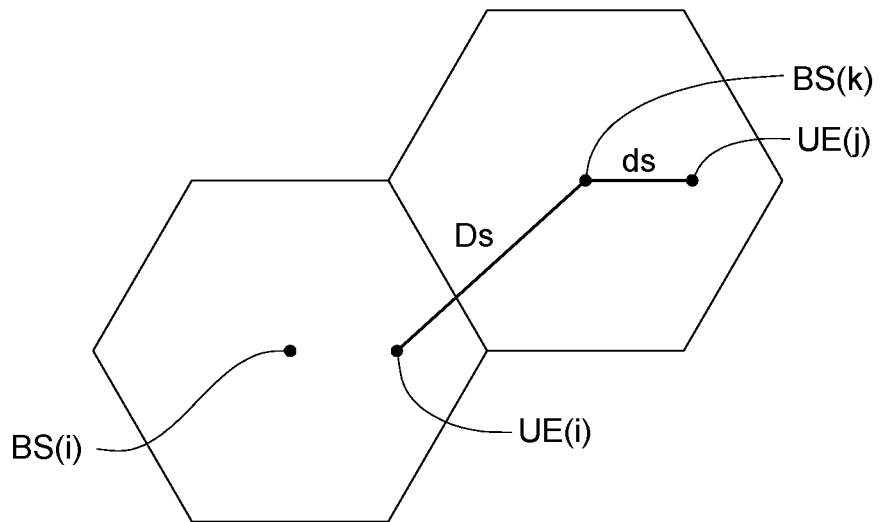
FIG. 15A shows the relation between a distance Ds and a distance ds for a downlink communication.

After that, in step 1312, it is determined that whether the interference distance between user equipments UE(i) and UE(j) is smaller than an interference radius. For a downlink communication, when a distance Ds between the user equipment UE(i) and the base station BS(k) minus a distance ds between the user equipment UE(j) and the base station BS(k) (i.e. Ds-ds, as shown in FIG. 15A) is less than a first interference radius, it is determined that the interference distance between user equipments UE(i) and UE(j) is smaller than an interference radius, and interference exists between the user equipment UE(j) and the user equipment UE(i).

Figure 15B:
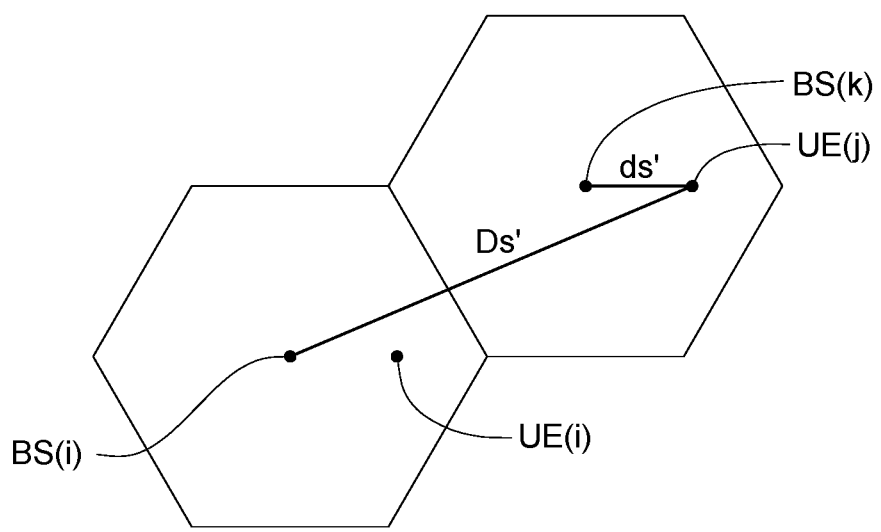
FIG. 15B shows the relation between a distance Ds' and a distance ds' for an uplink communication.

For an uplink communication, when a distance Ds' between the user equipment UE(j) and the base station BS(i) minus a distance ds' between the user equipment UE(j) and the base station BS(k) (i.e. Ds'-ds', as shown in FIG. 15B) is less than a second interference radius, it is determined that the interference distance between user equipments UE(i) and UE(j) is smaller than an interference radius, and interference exists between the user equipment UE(j) and the user equipment UE(i). The throughput is reduced when interference exists between the user equipment UE(j) and the user equipment UE(i). For example, it is determined that whether the interference distance between user equipments UE_1 and UE_4 is smaller than an interference radius to determine whether interference exists between the user equipment UE_1 and the user equipment UE_4 as shown in FIG. 14A.

Step 1312 can be performed for downlink communication and for uplink communication separately. That is, when the base stations are performing downlink communication with user equipments, the step 1312 are performed according to the criteria for downlink communication. Also, when user equipments are performing uplink communication with the base stations, the step 1312 are performed according to the criteria for uplink communication.

Figure 14B:
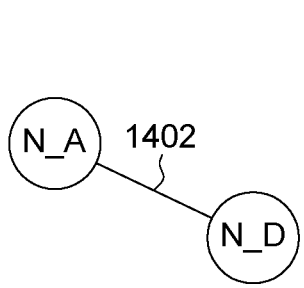
FIG. 14B illustrates an intermediate relation graph for the network.

When the determination in step 1312 is Yes, step 1314 is entered. When the determination in step 1312 is No, step 1316 is entered. In step 1314, establish a relation graph for the network, provide a connection connecting the node for base station BS(i) and the node for base station BS(k), and record the user equipment UE(j) which have interference with the user equipment UE(i). For example, referring to FIG. 14B, an intermediate relation graph for the network is illustrated. Since interference exists between the user equipment UE(i) (UE_1) and the user equipment UE(j) (UE_4), the node N_A for base station BS(k) (BS_A) and the node N_D for base station BS(i) (BS_D) are connected by a connection 1402. And, the user equipment UE_4 is recorded as having interference with the user equipment UE_1.

In step 1316, it is determined that whether there is any other user equipment which communicates with the base station BS(k) and the interference determination of step 1312 has not been performed with. If Yes, step 1318 is entered; if No, step 1320 is entered. In step 1318, the value of parameter j is added by 1. After the step 1318, step 1310 is entered to select a user equipment UE(j) (j=2) from the user equipments communicating with the base station BS(k). For example, user equipment UE_3 is selected as the user equipment UE(j) (j=2). Then, step 1312 is performed to determine that whether the interference distance between user equipments UE_1 and UE_3 is smaller than an interference radius. Assume the determination is No, and then step 1316 is entered. Assume the determination in step 1316 is No, and then step 1320 is entered.

Figure 14C:
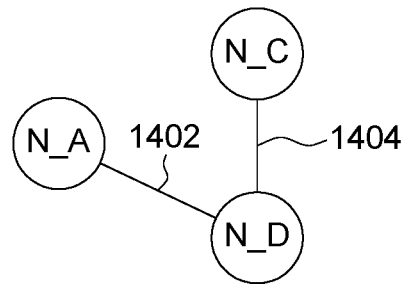
FIG. 14C illustrates an intermediate relation graph for the network.

In step 1320, it is determined that whether there is any other base station in the neighbor list NL(i) which the interference determination of step 1312 has not been performed with any user equipment communicating with. If Yes, step 1322 is performed to add 1 to the parameter k and set parameter j=1; if No, step 1324 is entered. After the step 1322, the step 1308 is entered and a base station BS(k) (k=2) is selected from the neighbor list NL(i). Assume base station BS_C is selected as BS(k) (k=2). After that, in step 1310, select a user equipment UE(j) (j=1) from the user equipments communicating with the base station BS(k) (k=2). Since user equipment UE_5 and UE_6 communicates with the base station BS_C, assume user equipment UE_5 is selected as UE(j) (j=1). Then, in step 1312, it is determined that whether the interference distance between user equipments UE(i) (i=1) (that is, US_1) and UE(j) (j=1) (that is, US_5) is smaller than an interference radius. Assume the determination is Yes, and then step 1314 is entered. In step 1314, establish a relation graph for the network, provide a connection (connection 1404 in FIG. 14C) connecting the node (node N_D) for base station BS(i) (BS_D) and the node (node N_C) for base station BS(k) (BS_C), and record the user equipment UE(j) (UE_5) which have interference with the user equipment UE(i) (UE_1).

After that, step 1316 is entered to determine that whether there is any other user equipment which communicates with the base station BS(k) (BS_C) and the interference determination of step 1312 has not been performed with. It is determined that the user equipment UE_6 which communicates with the base station (BS_C) and the interference determination of step 1312 has not been performed with. Therefore, steps 1318, 1310, 1312, and 1314 are performed with the user equipment UE_6. After that, steps 1316 and 1320 are performed and other base station in the neighbor list NL(i) (currently, the neighbor list NL(i) of the base station BS_D is NL(1), NL(1)={BS_A, BS_B, BS_C, BS_E, BS_F, BS_G}), for example, one of base stations BS_B, BS_E, BS_F, and BS_G, is selected to perform steps 1308 to 1320. Above steps are performed recursively until all of the base stations in the neighbor list NL(i) are selected and related processes are performed.

In step 1324, it is determined that whether there is any user equipment in the user equipment list which is never selected as an operation reference point. Since in the example of the user equipment list UEL={UE_1, UE_2, UE_3, UE_4, UE_5, UE_6, UE_7}, only user equipment UE_1 is selected as an operation reference point, and user equipments UE_2 to UE_7 are not selected as an operation reference point. Therefore, the determination of step 1324 is Yes, and step 1326 is entered. In step 1326, the parameter i is added by 1, and then step 1304 is entered to select user equipment UE(i) (=UE(2)) as an operation reference point from the user equipment list which includes all user equipments in the network (for example, user equipment list UEL={UE_1, UE_2, UE_3, UE_4, UE_5, UE_6, UE_7}). Assume the user equipment UE_2 is selected as an operation reference point to perform steps 1306 to 1322.

Figure 14D:
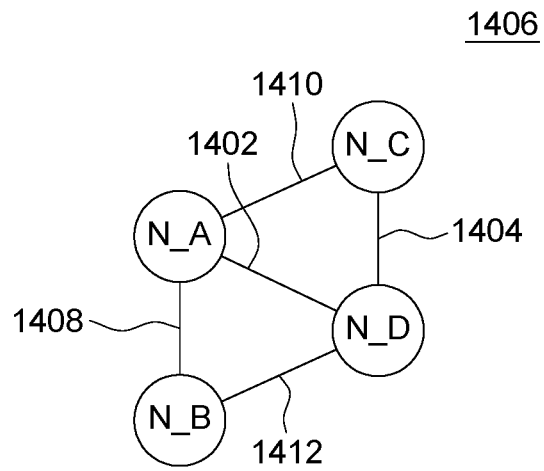
FIG. 14D illustrates an intermediate relation graph for the network.

Assume after all of the user equipment in the user equipment list are selected as an operation reference point to perform steps 1306 to 1322, the result relation graph is the relation graph 1406 shown in FIG. 14D. Assume the result shows that the user equipment UE_1 has interference with the user equipment UE_4, the user equipment UE_4 has interference with the user equipment UE_5, the user equipment UE_1 has interference with the user equipment UE_6, and the user equipment UE_1 has interference with the user equipment UE_2. Therefore, the corresponding relation graph 1406 in FIG. 14D shows that node N_A is connected to node N_B by connection 1408, node N_A is connected to node N_C by connection 1410, node N_B is connected to node N_D by connection 1412, node N_A is connected to node N_D by connection 1402, and node N_C is connected to node N_D by connection 1404.

Figure 14E:
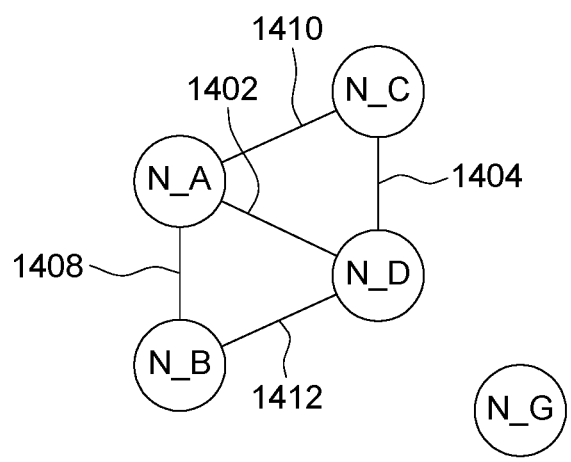
FIG. 14E illustrates a final relation graph for the network.

When the determination of step 1324 is No, step 1328 is entered. In step 1328, the base station of which the user equipment(s) does not have interference with any user equipment of other base station in the network is chosen. The node for the chosen base station is provided in the relation graph. For example, assume user equipment UE_7 does not have interference with any of user equipments UE_1 to UE_6 of other base station in the network, then the base station BS_G corresponding to user equipment UE_7 is chosen. And, the node N_G for the base station BS_G is added in the relation graph as shown in FIG. 14E. Since the user equipment UE_7 of the base station BS_G has no interference with any other user equipments in the network, that is, the user equipment UE_1 to UE_6, the node N_G for the base station BS_G is isolated and the node N_G is not connected to any other node.

The step 1204 of generating base station combinations in FIG. 12 will be explained in more detailed in FIG. 16A and FIG. 16B. FIG. 16A shows the relation graph of FIG. 14E and the corresponding complete graphs, and FIG. 16B shows the relation graph of another example and the corresponding complete graphs. In each base station combination, interference exists between user equipment(s) of any two base stations in each base station combination corresponds to a complete graph. In a complete graph, every node is connected to all other node(s) by connection(s). For example, the relation graph of FIG. 16A includes complete graph {N_A, N_C, N_D}, {N_A, N_B, N_D}, {N_G}, and the relation graph of FIG. 16B includes complete graph {N_A}, {N_C, N_D}, {N_B, N_D, N_E}.

The step 1206 of obtaining a BWP resource allocation result in FIG. 12 will be explained in more detailed in FIG. 17. In step 1702, set parameters p=1 and q=1, p and q are integers. In step 1704, take complete graph CG(p) as operation starting graph. For example, complete graph CG(p)={N_A, N_C, N_D}. Then, in step 1706, a unit bandwidth is calculated. The unit bandwidth is calculated by dividing an available BWP bandwidth by N, N is an integer. N is the maximum selected from P and Q, P and Q are integers. P is an amount of user equipments of a particular base station in the base station combination of the complete graph CG(p). The particular base station has maximum amount of user equipments in the base station combination of the complete graph CG(p). Q is the amount of user equipments which have interference with each other in the base station combination of the complete graph CG(p).

For example, as shown in FIG. 14A, in the complete graph CG(p)={N_A, N_C, N_D}, the amount of user equipments of base station BS_A is 2 (user equipments UE_3 and UE_4), the amount of user equipments of base station BS_C is 2 (user equipments UE_5 and UE_6), and the amount of user equipments of base station BS_D is 1 (user equipments UE_1). Therefore, the value of P is 2 which is the maximum value among 2, 2, and 1.

Since the user equipment UE_1 has interference with the user equipment UE_4, the user equipment UE_4 has interference with the user equipment UE_5, the user equipment UE_1 has interference with the user equipment UE_6 as mention above, the amount of user equipments which have interference with each other in the base station combination of the complete graph CG(p) is 4 (corresponding to UE_1, UE_4, UE_5, UE_6). Therefore, the value of Q is 4. Since N is the maximum selected from P(=2) and Q(=4), the value of N is equal to Q, that is, 4. The unit bandwidth is calculated by dividing an available BWP bandwidth by N (=4), that is, the unit bandwidth is ¼ of the available BWP bandwidth.

In step 1708, the available BWP bandwidth is allocated according to the amount of user equipments in each base stations of the complete graph CG(p). Referring to FIG. 18A to FIG. 18D, the amounts of user equipments having interference and amounts of user equipments without interference are calculated firstly, then the BWP frequency band of the available BWP bandwidth are allocated to the user equipments having interference.

For example, the user equipments which have interference with each other in the base station combination of the complete graph CG(p) is grouped, that is, user equipments UE_1, UE_4, UE_5, UE_6 are grouped. Each of the user equipments UE_1, UE_4, UE_5, UE_6 are allocated with one unit bandwidth, that is ¼ of the available BWP bandwidth. For example, the user equipment UE_1 is assigned with a BWP frequency band FB_3 and the user equipment UE_4 is assigned with a BWP frequency band FB_4, the BWP frequency band FB_3 is different from the BWP frequency band FB_4. Since the user equipment UE_1 and the user equipment UE_4 communicate with base station BS_D and base station BS_A respectively with different BWP frequency bands FB_3 and FB_4, the interference between the user equipment UE_1 and the user equipment UE_4 will not occur.

Since user equipments UE_5 and UE_6 communicate to the same base station BS_C with signals orthogonal to each other, the user equipments UE_5 and UE_6 can share the same BWP frequency band. Therefore, the user equipment UE_5 is assigned with BWP frequency bands FB_1 and FB_2, while the user equipment UE_6 is also assigned with BWP frequency bands FB_1 and FB_2. Since the user equipment UE_4 and the user equipment UE_5 communicate with base station BS_A and base station BS_C respectively with different BWP frequency bands FB_4 and FB_1 and FB_2, the interference between the user equipment UE_4 and the user equipment UE_5 will not occur. Similarly, the interference between the user equipment UE_1 and the user equipment UE_6 will not occur.

After that, the user equipment(s) without interference is assigned with BWP frequency band(s) which is not assigned to the user equipment(s) having interference. For example, since the user equipment UE_3 have no interference with the group of the user equipments UE_1, UE_4, UE_5, and UE_6, the user equipment UE_3 is assigned with BWP frequency bands FB_1 to FB_3, which are not assigned to the user equipment UE_4.

After that, step 1710 is performed. In step 1710, a complete graph CG(q) is selected from other complete graph(s), and the available BWP bandwidth are allocated according to the amount of user equipments in each base stations of the complete graph CG(q) and the BWP bandwidth allocation result of the complete graph CG(p). The selected complete graph CG(q) has maximum overlapped node(s) with the complete graph CG(p). For example, the complete graph {N_A, N_B, N_D} are selected as the complete graph CG(q). For example, the user equipments which have interference with each other in the base station combination of the complete graph CG(q) is grouped, that is, user equipments UE_1, UE_2, and UE_4 are grouped.

Since the user equipment UE_2 have interference with the user equipments UE_1 and UE_4, the user equipment UE_2 is assigned with BWP frequency bands FB_1 and FB_2, which are not assigned to the user equipment UE_1 and UE_4. Since the user equipment UE_2 and the user equipment UE_1 communicate with base station BS_B and base station BS_D respectively with different BWP frequency bands FB_1 and FB_2 and FB_4, the interference between the user equipment UE_1 and the user equipment UE_2 will not occur.

Then, step 1712 is performed. In step 1712, the allocation result is recorded. Then, step 1714 is entered. In step 1714, it is determined that whether there is any other complete graph in which the available BWP bandwidth are not yet allocated. Since the available BWP bandwidth of the complete graph {N_G} is not yet allocated, the determination of step 1714 is Yes, and then step 1716 is entered and the value of the parameter q is added by 1. Then, step 1710 is entered.

Figure 18A:
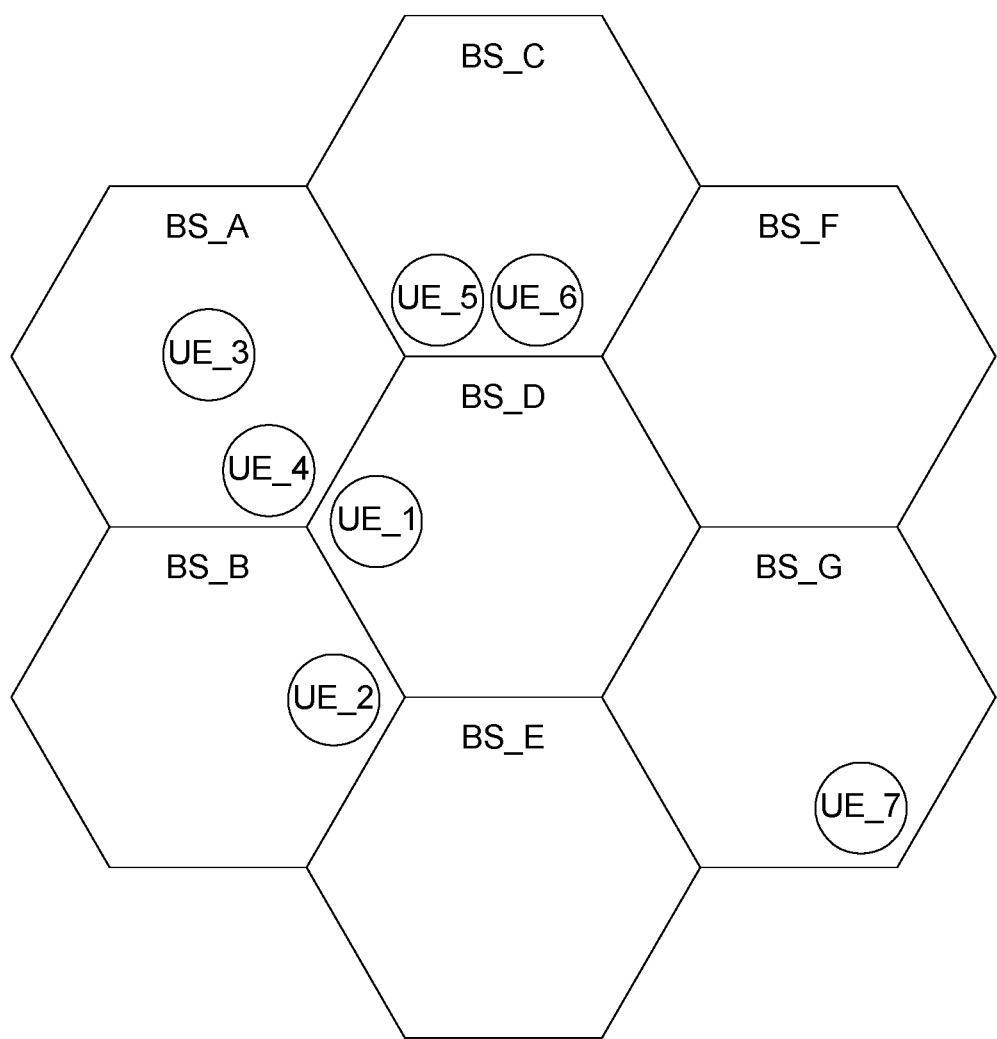
FIG. 18A to FIG. 18D illustrate the amounts of user equipments having interference and amounts of user equipments without interference, and allocating the BWP frequency band of the available BWP bandwidth to the user equipments having interference.
Figure 18B:
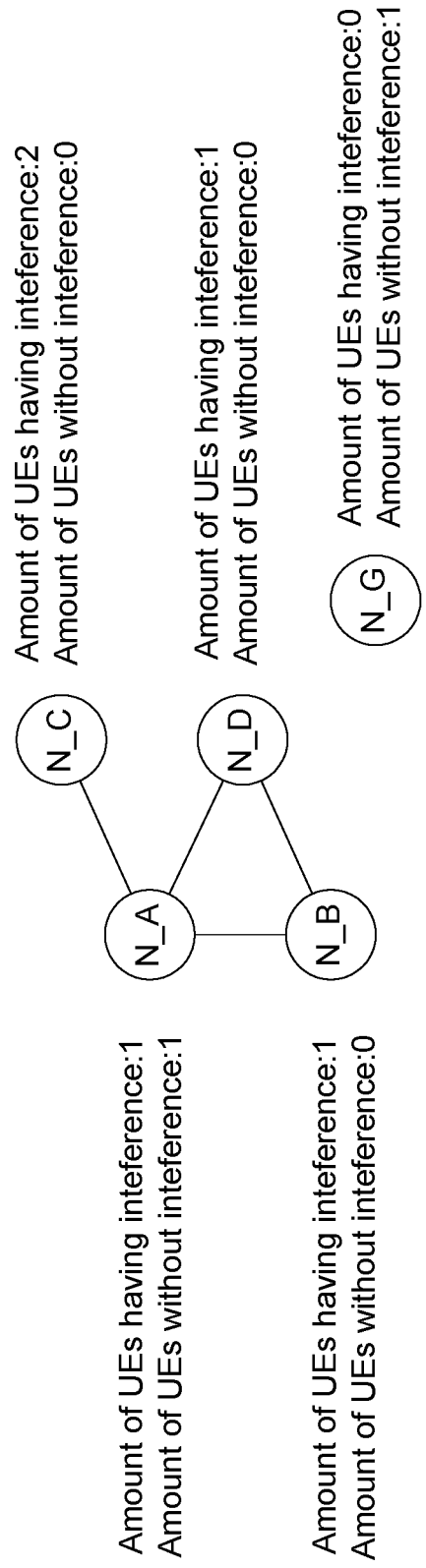
Figure 18C:
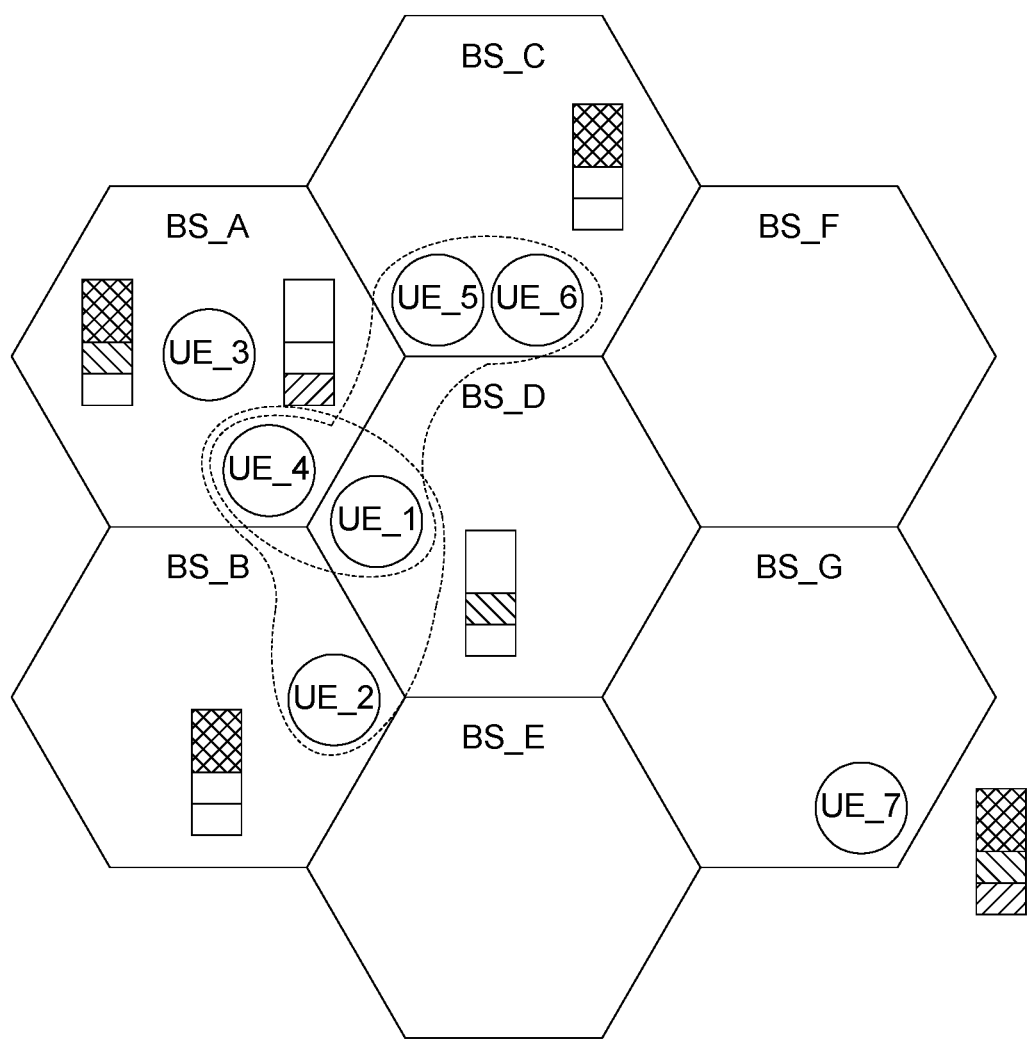
Figure 18D:
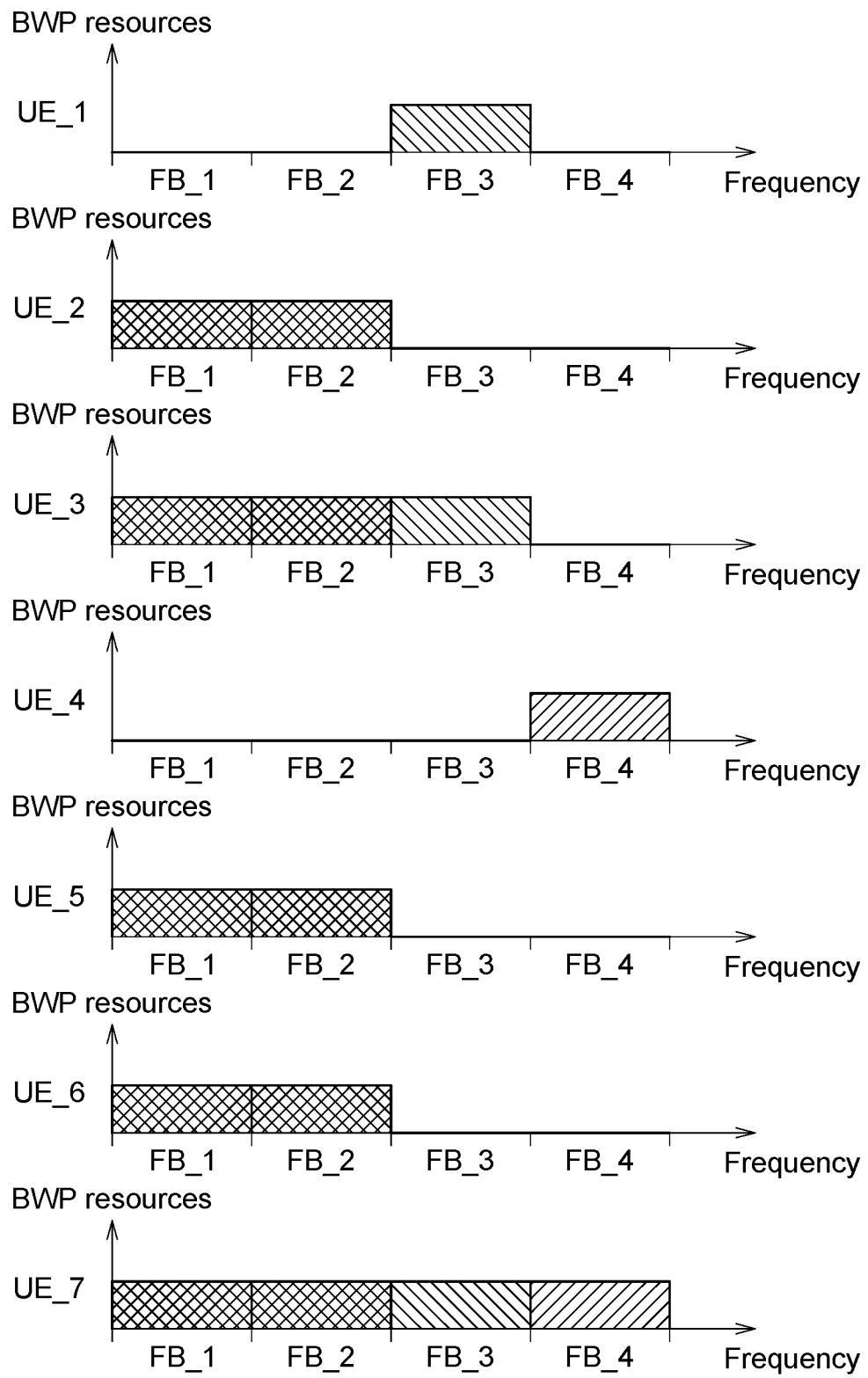

In step 1710, the complete graph {N_G} is selected as the complete graph CG(q) (q=2). Since the user equipment UE_7 does not have interference with any other user equipment of other base station, all of the available BWP bandwidth can be assigned to the user equipment UE_7. That is the user equipment UE_7 is assigned with BWP frequency bands FB_1 to FB_4, as shown in FIG. 18C and FIG. 18D.

When the determination of step 1714 is No, step 1718 is entered. In step 1718, the allocation result for the network is recorded. That is, the allocation result for all user equipments of all base station is recorded. Then, in step 1720, it is determined that whether there is any complete graph which is not yet taken as operation starting graph. For example, since the complete graphs {N_A, N_B, N_D} and {N_G} are not yet taken as operation starting graph, the determination is Yes and the step 1722 is entered. In step 1722, the value of parameter p is added by 1, and step 1704 is entered. In step 1704, for example, the complete graphs {N_A, N_B, N_D} is taken as operation starting graph, and steps 1706 to 1720 are repeated.

The step of 1208 of FIG. 12 in which the BWP resource allocation result which conforms to a SLA is found out is explained in more detailed below. FIG. 19 illustrates the allocation result table by taking the complete graphs {N_A, N_C, N_D} as operation starting graph. The allocation result table in FIG. 19 shows the user equipment ID and corresponding assigned BWP bandwidth (proportion of available BWP bandwidth). According to the allocation result table in FIG. 19, it is determined that whether the modulation and code rate and throughput satisfy the requirement of SLA. When the requirement of SLA is satisfied, the allocation result is accepted, and then the step 412 of FIG. 4 will be performed.

Figure 17:
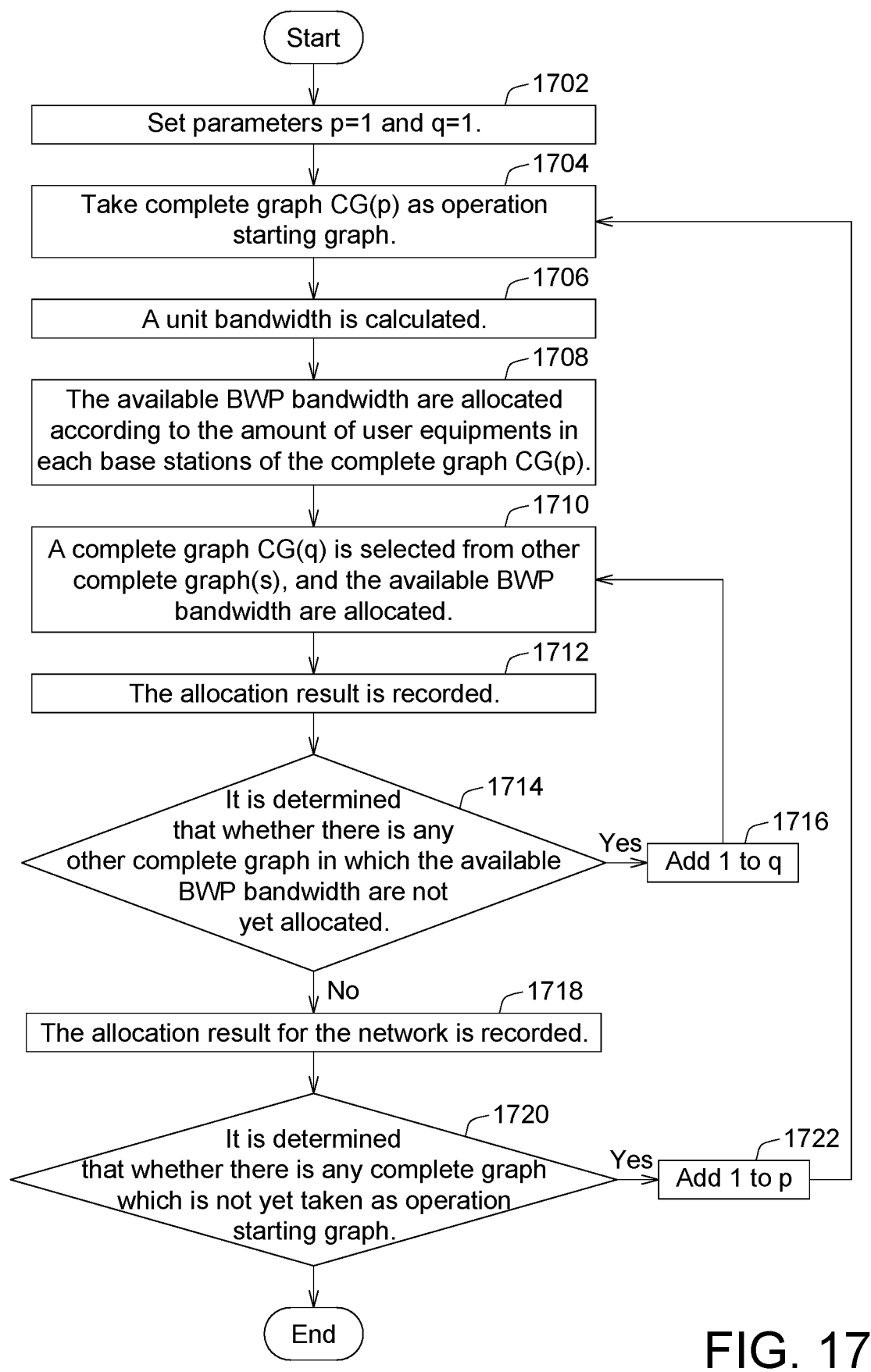
FIG. 17 illustrates the detailed process for the step 1206 of obtaining a BWP resource allocation result in FIG. 12.

In some embodiment, the processes in FIG. 17 can be terminated once the requirement of SLA is satisfied. For example, when the allocation result by taking the first complete graphs {N_A, N_C, N_D} as operation starting graph can satisfy the requirement of SLA, the process in FIG. 17 can be terminated (for example, the method can stop at the step 1720). In some embodiment, the process in FIG. 17 for all complete graphs taken as operating starting graph is completed, then the best allocation result is taken for performing the step 412 of FIG. 4.

Figure 20A:
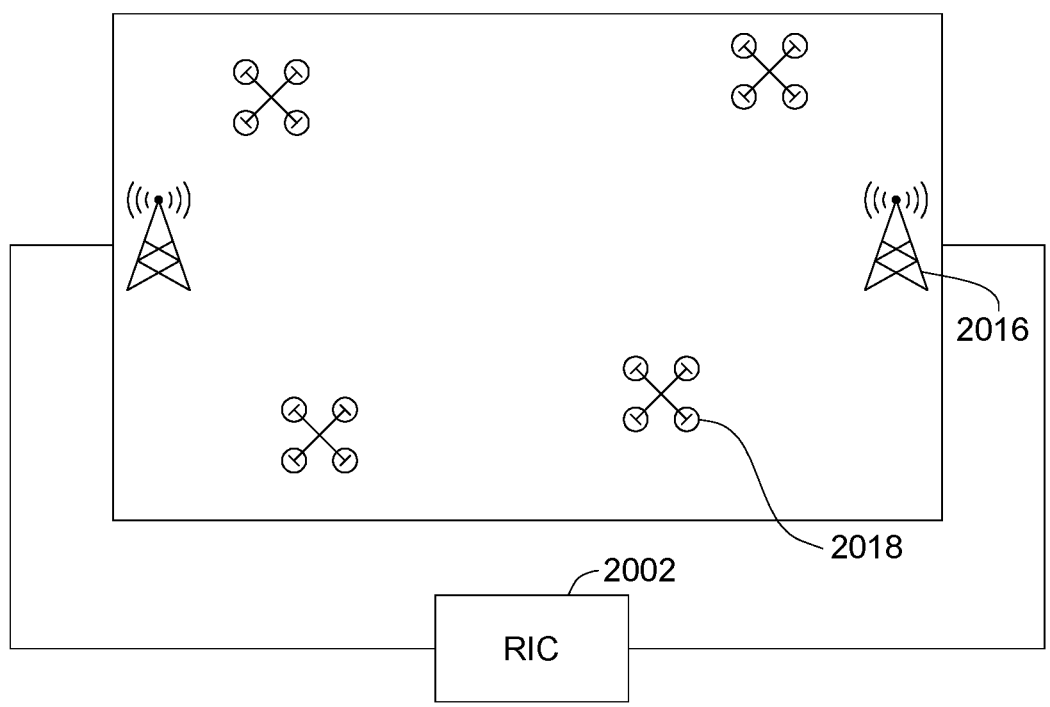
FIG. 20A and FIG. 20B shows an example of application for the method of BWP management for a network according to an embodiment of the application.
Figure 20B:
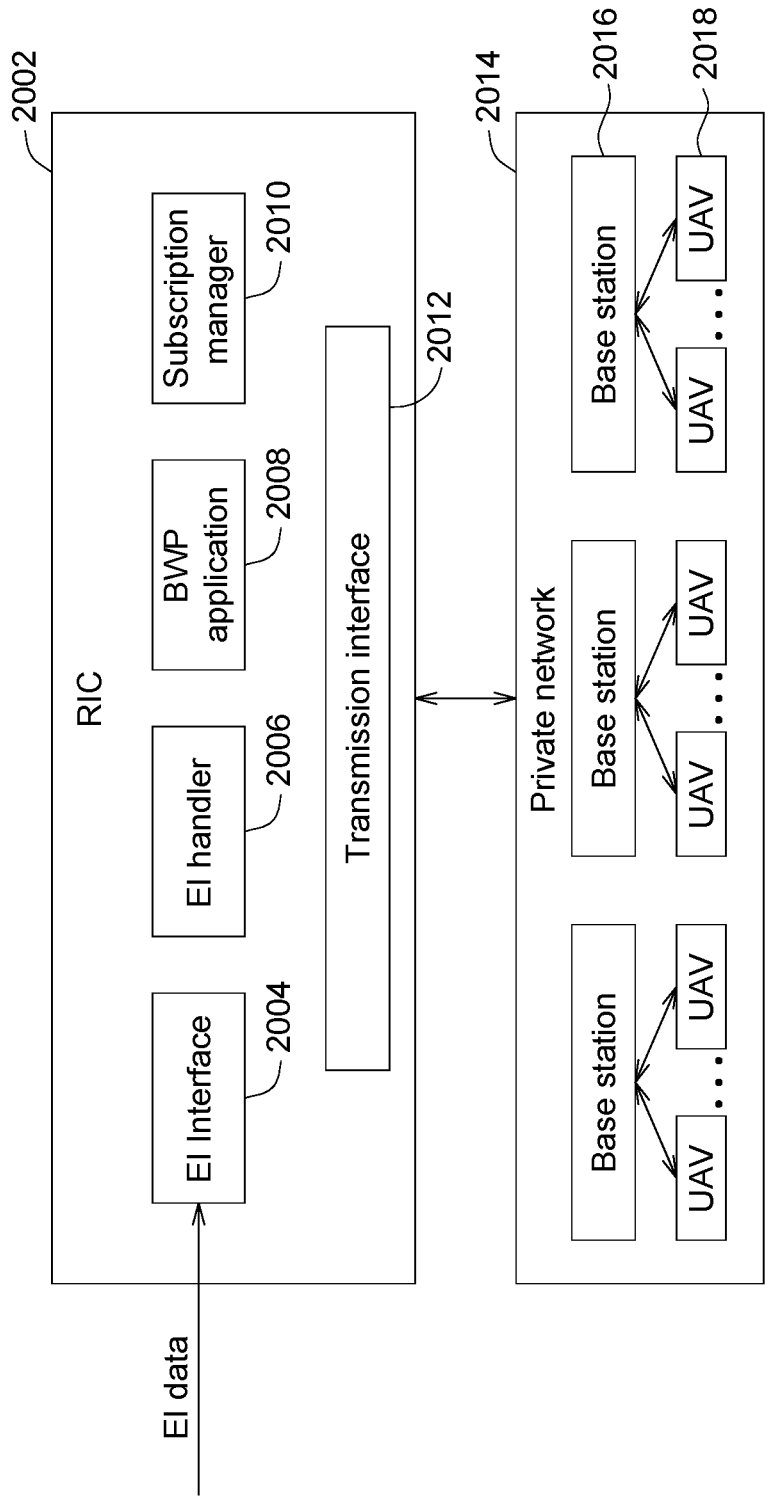

FIG. 20A and FIG. 20B shows an example of application for the method of BWP management for a network according to an embodiment of the application. FIG. 20A shows the unmanned aerial vehicle (UAV) racing field and FIG. 20B shows the block diagram for the network of UAV racing field. Assume the field size of the UAV racing field is 60 m×30 m, UAV racing field is 5G (fifth generation) field with two base stations, and the bandwidth is 100 MHz with time-division duplexing (TDD). Assume 4 UAVs races simultaneously in this example.

As shown in FIG. 20B, the controller is implemented by an open RAN (O-RAN) near real time (RT) RAN intelligent controller (RIC) 2002. The RIC 2002, for example, includes an enrichment information (EI) interface 2004, EI handler 2006, BWP application 2008, subscription manager 2010, and transmission interface 2012. The EI interface 2004 receives EI data, for example, UAV position data. The EI handler 2006 handles the EI data. The BWP application 2008 performs the calculation for the method of BWP management for a network. The subscription manager 2010 is configured to subscribe the BWP function of base stations. The transmission interface 2012 is configured to communicate with base stations 2016 of a private network 2014. The private network 2014 includes a number of base stations 2016, for example, gNB (Next Generation Node B), and a number of UAVs 2018.

Figure 21:
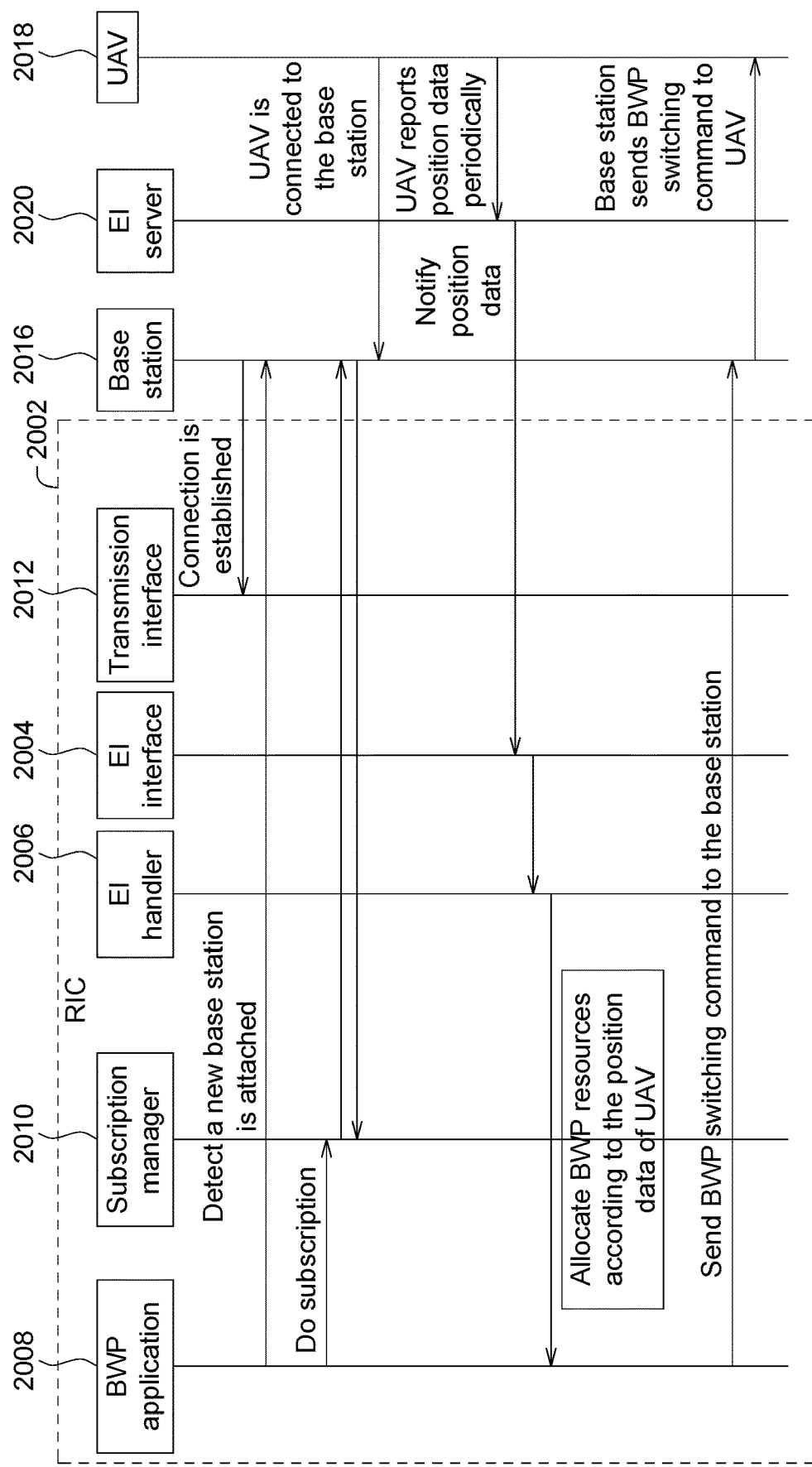
FIG. 21 shows an example of the sequence diagram for the network of UAV racing field of FIGS. 20A and 20B.

Referring to FIG. 21, an example of the sequence diagram for the network of UAV racing field of FIGS. 20A and 20B. Firstly, base station 2016 transmits a message to inform the transmission interface 2012 that connection between RIC 2002 and base station 2016 is established. Then, BWP application 2008 transmits a message to inform the base station 2016 that RIC 2002 has detected that a new base station is attached. BWP application 2008 also transmits a command of doing subscription to the subscription manger 2010. The subscription manger 2010 then sends a command of doing subscription to the base station 2016 and the base station 2016 replies acceptance for the subscription.

After that, the UAV 2018 sends a message to inform the base station 2016 that the UAV 2018 is connected to the base station 2016. The UAV 2018 reports the position data of UAV 2018 periodically to EI server 2020 (not shown in FIG. 20A and FIG. 20B). The EI server 2020 notifies the position data of UAV 2018 to EI interface 2004, and EI interface 2004 transmits the position data of UAV 2018 to EL handler 2006, and EI handler 2006 transmits the position data of UAV 2018 to BWP application 2008. The BWP application 2008 allocates BWP resources according to the position data of UAV 2018 according to the method of BWP management for a network according to an embodiment of the application. The BWP application 2008 sends BWP switching command to the base station 2016 according to the allocation result, and the base station 2016 sends BWP switching command to the UAV 2018.

The method of BWP management for a network and a controller therefor can increase modulation and code rate, which improves the throughput of signal transmission by dynamically generating at least one base station combination and performing BWP resource allocation based on the at least one base station combination and the interference status of the user equipments. The obtained BWP resource allocation result can make the private 5G network satisfy dynamic SLA assurance, and high quality of experience (QoE) can be achieved. Furthermore, moving user equipments can have stable QoE, different QoE requirements for different user equipments can be met, and even dynamically changed QoE requirements of user equipments can be satisfied.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of bandwidth part (BWP) management for a network,
performed by a controller, comprising:
receiving position information of a plurality of user equipments, the network comprising a plurality of base stations communicating with the user equipments, the user equipments comprising a first user equipment and a second user equipment;
determining whether interference exists between any two of the user equipments based on the position information of the user equipments and the position information of the base stations to obtain an interference status of the user equipments;
generating at least one base station combination, wherein interference exists between user equipment(s) of any two base stations in each of the at least one base station combination, the at least one base station combination comprises a first base station combination, the first base station combination comprises a first base station and a second base station, the first base station communicates with the first user equipment, the second base station communicates with the second user equipment, interference exists between the first user equipment and the second user equipment; and
performing BWP resource allocation based on the at least one base station combination and the interference status of the user equipments to obtain a BWP resource allocation result;
wherein the first user equipment is assigned with a first BWP frequency band and the second user equipment is assigned with a second BWP frequency band in the BWP resource allocation result, the first BWP frequency band is different from the second BWP frequency band.

2. The method according to claim 1, wherein for a downlink communication, when a distance between the second user equipment and the first base station minus a distance between the first user equipment and the first base station is less than a first interference radius, it is determined that interference exists between the first user equipment and the second user equipment.

3. The method according to claim 1, wherein for an uplink communication, when a distance between the first user equipment and the second base station minus a distance between the first user equipment and the first base station is less than a second interference radius, it is determined that interference exists between the first user equipment and the second user equipment.

4. The method according to claim 1, wherein a unit bandwidth of the first BWP frequency band is obtained by dividing an available BWP bandwidth by P, P is an integer, P is an amount of user equipments of a particular base station in the first base station combination, and the particular base station has maximum amount of user equipments in the first base station combination.

5. The method according to claim 1, wherein a unit bandwidth of the first BWP frequency band is obtained by dividing an available BWP bandwidth by Q, Q is an integer, Q is the amount of user equipments which have interference with each other in the first base station combination.

6. The method according to claim 1, wherein a unit bandwidth of the first BWP frequency band is obtained by dividing an available BWP bandwidth by N, N is an integer, N is the maximum selected from P and Q, P and Q are integers, P is an amount of user equipments of a particular base station in the first base station combination, the particular base station has maximum amount of user equipments in the first base station combination, and Q is the amount of user equipments which have interference with each other in the first base station combination.

7. The method according to claim 1, further comprising:
    establishing a relation graph for the network, wherein the relation graph comprises a plurality of nodes and a plurality of connection lines, the nodes comprise a first node and a second node, the connection lines comprise a first connection line, the first node represents the first base station, the second node represents the second base station, the first connection connects the first node and the second node;
    wherein the relation graph comprises at least one complete graph corresponding to the at least one base station combination, the at least one complete graph comprises a first complete graph corresponding to the first base station combination;
    wherein the user equipments which have interference with each other in the base stations of the first complete graph are assigned with different BWP frequency bands in the BWP resource allocation result.

8. The method according to claim 1, wherein the first base station combination further comprises a third base station, the user equipments further comprises a third user equipment, the third user equipment communicates with the third base station, the third user equipment is assigned with a third BWP frequency band, the third BWP frequency band is different from the first BWP frequency band, and the third BWP frequency band is different from the second BWP frequency band.

9. The method according to claim 1, wherein the at least one base station combination further comprises a second base station combination, the second base station combination comprises the first base station and a fourth base station, the user equipments further comprises a fourth user equipment, the fourth user equipment communicates with the fourth base station, the fourth user equipment is assigned with a fourth BWP frequency band, the fourth BWP frequency band is different from the first BWP frequency band, and the fourth BWP frequency band is overlapped with the second BWP frequency band.

10. The method according to claim 1, further comprising:
    determining whether throughputs for the user equipments conform to a predetermined requirement in a service-level agreement; and
    sending a first BWP switching command to the first user equipment through the first base station and sending a second BWP switching command to the second user equipment through the second base station, wherein the first BWP switching command indicates that the first user equipment is assigned with the first BWP frequency band and the second BWP switching command indicates that the second user equipment is assigned with the second BWP frequency band.

11. A controller for performing BWP management for a network, comprising:
    an information interface, for receiving position information of a plurality of user equipments, the network comprising a plurality of base stations communicating with the user equipments, the user equipments comprising a first user equipment and a second user equipment; and
    a processor, configured to perform the following procedures:
        determining whether interference exists between any two of the user equipments based on the position information of the user equipments and the position information of the base stations to obtain an interference status of the user equipments;
        generating at least one base station combination, wherein interference exists between user equipment(s) of any two base stations in each of the at least one base station combination, the at least one base station combination comprises a first base station combination, the first base station combination comprises a first base station and a second base station, the first base station communicates with the first user equipment, the second base station communicates with the second user equipment, interference exists between the first user equipment and the second user equipment; and
        performing BWP resource allocation based on the at least one base station combination and the interference status of the user equipments to obtain a BWP resource allocation result;
    wherein the first user equipment is assigned with a first BWP frequency band and the second user equipment is assigned with a second BWP frequency band in the BWP resource allocation result, the first BWP frequency band is different from the second BWP frequency band.

12. The controller according to claim 11, wherein for a downlink communication, when a distance between the second user equipment and the first base station minus a distance between the first user equipment and the first base station is less than a first interference radius, it is determined that interference exists between the first user equipment and the second user equipment.

13. The controller according to claim 11, wherein for an uplink communication, when a distance between the first user equipment and the second base station minus a distance between the first user equipment and the first base station is less than a second interference radius, it is determined that interference exists between the first user equipment and the second user equipment.

14. The controller according to claim 11, wherein a unit bandwidth of the first BWP frequency band is obtained by dividing an available BWP bandwidth by P, P is an integer, P is an amount of user equipments of a particular base station in the first base station combination, and the particular base station has maximum amount of user equipments in the first base station combination.

15. The controller according to claim 11, wherein a unit bandwidth of the first BWP frequency band is obtained by dividing an available BWP bandwidth by Q, Q is an integer, Q is the amount of user equipments which have interference with each other in the first base station combination.

16. The controller according to claim 11, wherein a unit bandwidth of the first BWP frequency band is obtained by dividing an available BWP bandwidth by N, N is an integer, N is the maximum selected from P and Q, P and Q are integers, P is an amount of user equipments of a particular base station in the first base station combination, the particular base station has maximum amount of user equipments in the first base station combination, and Q is the amount of user equipments which have interference with each other in the first base station combination.

17. The controller according to claim 11, wherein the processor is further configured to perform the following procedures:
establishing a relation graph for the network, wherein the relation graph comprises a plurality of nodes and a plurality of connection lines, the nodes comprise a first node and a second node, the connection lines comprise a first connection line, the first node represents the first base station, the second node represents the second base station, the first connection connects the first node and the second node;
wherein the relation graph comprises at least one complete graph corresponding to the at least one base station combination, the at least one complete graph comprises a first complete graph corresponding to the first base station combination;
wherein the user equipments which have interference with each other in the base stations of the first complete graph are assigned with different BWP frequency bands in the BWP resource allocation result.

18. The controller according to claim 11, wherein the first base station combination further comprises a third base station, the user equipments further comprises a third user equipment, the third user equipment communicates with the third base station, the third user equipment is assigned with a third BWP frequency band, the third BWP frequency band is different from the first BWP frequency band, and the third BWP frequency band is different from the second BWP frequency band.

19. The controller according to claim 11, wherein the at least one base station combination further comprises a second base station combination, the second base station combination comprises the first base station and a fourth base station, the user equipments further comprises a fourth user equipment, the fourth user equipment communicates with the fourth base station, the fourth user equipment is assigned with a fourth BWP frequency band, the fourth BWP frequency band is different from the first BWP frequency band, and the fourth BWP frequency band is overlapped with the second BWP frequency band.

20. The controller according to claim 11, wherein the processor is further configured to perform the following procedures:
determining whether throughputs for the user equipments conform to a predetermined requirement in a service-level agreement; and
sending a first BWP switching command to the first user equipment through the first base station and sending a second BWP switching command to the second user equipment through the second base station, wherein the first BWP switching command indicates that the first user equipment is assigned with the first BWP frequency band and the second BWP switching command indicates that the second user equipment is assigned with the second BWP frequency band.

\* \* \* \* \*